US012812347B2

(12) United States Patent
Grayson et al.

(10) Patent No.: US 12,812,347 B2
(45) Date of Patent: Nov. 24, 2026

(54) PROVIDING EMERGENCY TELECOMMUNICATION SERVICES AND APPLICATION DRIVEN PROFILE PRIORITIZATION FOR WIRELESS NETWORK ARCHITECTURES

(71) Applicant: Cisco Technology, Inc., San Jose, CA (US)

(72) Inventors: Mark Grayson, Maidenhead (GB); Srinath Gundavelli, San Jose, CA (US); Scott Ross Blue, Oulu (FI); Malcolm M. Smith, Richardson, TX (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 307 days.

(21) Appl. No.: 18/355,644

(22) Filed: Jul. 20, 2023

(65) Prior Publication Data

US 2024/0196181 A1 Jun. 13, 2024

Related U.S. Application Data

(60) Provisional application No. 63/435,360, filed on Dec. 27, 2022, provisional application No. 63/431,396, filed on Dec. 9, 2022.

(51) Int. Cl.

| | |
|---|---|
| ***H04W 4/90*** | (2018.01) |
| ***H04W 4/029*** | (2018.01) |
| ***H04W 12/06*** | (2021.01) |

(52) U.S. Cl.
CPC ............. *H04W 4/90* (2018.02); *H04W 4/029* (2018.02); *H04W 12/06* (2013.01)

(58) Field of Classification Search
CPC ........ H04W 4/90; H04W 4/029; H04W 12/06
See application file for complete search history.

(56) References Cited

U.S. PATENT DOCUMENTS 7,245,900 B1 * 7/2007 Lamb .................. H04M 3/5116 455/500
10,652,950 B2 5/2020 Gundavelli et al.
(Continued)

FOREIGN PATENT DOCUMENTS

EP 2671395 B1 * 10/2018 ......... H04L 65/1069
EP 3189635 B1 * 5/2019 .......... H04W 64/003
(Continued)

OTHER PUBLICATIONS

Rosenberg, J., et al., "SIP: Session Initiation Protocol," The Internet Society, Network Working Group, Request for Comments: 3261, Jun. 2002, 269 pages.
(Continued)

*Primary Examiner* — Erika A Washington
(74) *Attorney, Agent, or Firm* — Edell, Shapiro & Finnan, LLC

(57) ABSTRACT

Provided herein are techniques for providing emergency telecommunication services and application driven profile prioritization for wireless local area network architectures. In one instance, a method can include facilitating, for an emergency call initiated by a wireless device, connection of the wireless device with a radio node; providing a location tag to the wireless device that is associated with a location of the wireless device; obtaining, by an emergency services identity provider, a session initiation protocol (SIP) registration request message from the wireless device that includes the location tag; determining, by the emergency services identity provider, a location of the wireless device based, at least in part, on the location tag; and facilitating the emergency call for the wireless device with a public safety answering point (PSAP) that is determined based on the location of the wireless device in which the location is provided to the PSAP.

31 Claims, 10 Drawing Sheets

(56) References Cited

U.S. PATENT DOCUMENTS

| | | | | |
|---|---|---|---|---|
| 10,805,982 | B1 * | 10/2020 | Buckley | H04L 65/1069 |
| 2004/0198311 | A1 | 10/2004 | Aerrabotu et al. | |
| 2009/0296688 | A1 * | 12/2009 | Bakker | H04L 65/1104 370/352 |
| 2013/0217355 | A1 | 8/2013 | Ray et al. | |
| 2015/0111527 | A1 | 4/2015 | Michaelis et al. | |
| 2017/0295479 | A1 | 10/2017 | Artuso | |
| 2020/0163013 | A1 | 5/2020 | Grayson et al. | |
| 2020/0323001 | A1 | 10/2020 | Bakker | |
| 2020/0351623 | A1 | 11/2020 | Eisner | |
| 2022/0312182 | A1 | 9/2022 | Venkataraman et al. | |
| 2023/0123348 | A1 | 4/2023 | Mehta et al. | |

FOREIGN PATENT DOCUMENTS

| | | | |
|---|---|---|---|
| KR | 20130064287 | A | 6/2013 |
| WO | 2008083928 | A1 | 7/2008 |
| WO | 2022082024 | A1 | 4/2022 |
| WO | 2023206987 | A1 | 11/2023 |

OTHER PUBLICATIONS

Rosenberg, J., et al., "Reliability of Provisional Responses in the Session Initiation Protocol (SIP)," The Internet Society, Network Working Group, Request for Comments: 3262, Jun. 2002, 14 pages.
International Search Report and Written Opinion for International Application No. PCT/US2023/082005, mailed Feb. 13, 2024, 15 Pages.
Public Safety and Homeland Security Bureau: "Study on Emergency 911 Access to Wi-Fi Access Points and Spectrum for Unlicensed Devices When Mobile Service is Unavailable", Submitted pursuant to Section 301 of the Repack Airwaves Yielding Better Access for Users of Modern Services (Ray Baum's) Act, Mar. 23, 2021, XP093126749, 23 pages.
3GPP TR 23.771: "3rd Generation Partnership Project, Technical Specification Group Services and System Aspects, Study on system impacts of IMS Emergency Sessions over WLAN (Release 13)", 3GPP TR 23.771 V13.0.0, Jun. 2016, pp. 1-64.
3GPP TS 23.167: "3rd Generation Partnership Project, Technical Specification Group Services and System Aspects, IP Multimedia Subsystem (IMS) Emergency Sessions (Release 18)", 3GPP TS 23.167 V18.1.0, Jun. 2023, pp. 1-67.
3GPP TS 23.501: "3rd Generation Partnership Project, Technical Specification Group Services and System Aspects, System architecture for the 5G System (5GS), Stage 2 (Release 18)", 3GPP TS 23.501 V18.2.2, Jul. 2023, pp. 1-684.
3GPP TS 24.229: "3rd Generation Partnership Project, Technical Specification Group Core Network and Terminals, IP Multimedia Call Control Protocol Based on Session Initiation Protocol (SIP) and Session Description Protocol (SDP), Stage 3 (Release 18)", 3GPP TS 24.229 V18.2.0, Jun. 2023, pp. 1-1096.
Dekok A., et al., "Data Types in RADIUS", Internet Engineering Task Force (IETF), Request for Comments: 8044, Jan. 2017, 35 Pages.
Dekok A., et al., "Dynamic Authorization Proxying in the Remote Authentication Dial-In User Service (RADIUS) Protocol", Internet Engineering Task Force (IETF), Request for Comments: 8559, Apr. 2019, pp. 1-21.
Dekok A., "The Network Access Identifier," RFC: 7542, Internet Engineering Task Force, Standard, Internet Society (ISOC) 4, Rue Des Falaises CH-1205 Geneva, Switzerland, May 1, 2015, pp. 1-30, XP015104600, [Retrieved on May 1, 2015].
"Demystifying Wi-Fi Open Roaming", Systique, Aug. 9, 2022, pp. 1-9.
ETSI TS 123 167: "Universal Mobile Telecommunications System (UMTS), LTE, IP Multimedia Subsystem (IMS) emergency sessions (3GPP TS 23.167 version 17.2.0 Release 17)", ETSI TS 123 167 V17.2.0, May 2022, 69 Pages.
ETSI TS 123 501: "5G, System architecture for the 5G System (5GS) (3GPP TS 23.501 version 17.9.0 Release 17)", ETSI TS 123 501 V17.9.0, Jul. 2023,575 Pages.
ETSI TS 124 229: "Digital Cellular Telecommunications System (Phase 2+) (GSM), Universal Mobile Telecommunications System (UMTS), LTE,5G, IP Multimedia Call Control Protocol Based on Session Initiation Protocol (SIP) and Session Description Protocol (SDP), Stage 3 (3GPP TS 24.229 version 17.10.0 Release 17)", ETSI TS 124 229 V17.10.0, Apr. 2023, 1148 Pages.
Funk P., et al., "Extensible Authentication Protocol Tunneled Transport Layer Security Authenticated Protocol Version 0 (EAP-TTLSv0)," Network Working Group, Request for Comments: 5281, Category: Informational, Aug. 2008, pp. 1-51.
Garcia-Martin M., "Private Header (P-Header) Extensions to the Session Initiation Protocol (SIP) for the 3rd-Generation Partnership Project (3GPP)", Network Working Group, Request for Comments: 3455, Jan. 2003, pp. 1-34.
Gellens R., et al., "Additional Data Related to an Emergency Call", Internet Engineering Task Force (IETF), Request for Comments: 7852, Jul. 2016, pp. 1-113.
Gundavelli S., et al., "Emergency 911 Services over Wi-Fi draft-gundavelli-dispatch-e911-wifi-00.txt", Internet-Draft, Mar. 13, 2023, pp. 1-15.
Gundavelli S., et al., "Emergency Communication Services over Wi-Fi Access Networks draft-gundavelli-dispatch-e911-wifi-01.txt", Internet-Draft, Jul. 10, 2023, 41 pages.
Jesske R., et al., "Private Header (P-Header) Extensions to the Session Initiation Protocol (SIP) for the 3GPP", Internet Engineering Task Force (IETF), Request for Comments: 7315, Jul. 2014, pp. 1-43.
"Passpoint (Hotspot 2.0)", Android Open Source Project, Retrieved on Jun. 23, 2023, 13 Pages.
Polk J., et al., "Dynamic Host Configuration Protocol Options for Coordinate-Based Location Configuration Information", Internet Engineering Task Force (IETF), Request for Comments: 6225, Jul. 2011, pp. 1-36.
Polk J., et al., "Location Conveyance for the Session Initiation Protocol", Internet Engineering Task Force (IETF), Request for Comments: 6442, Dec. 2011, pp. 1-35.
Rigney C., et al., "Remote Authentication Dial in User Service (RADIUS)", Network Working Group, Request for Comments: 2138, Apr. 1997, pp. 1-65.
Rigney C., et al., "Remote Authentication Dial In User Service (RADIUS)," Network Working Group, Request for Comments: 2865, Obsoletes: 2138, Category: Standards Track, Jun. 2000, 76 Pages.
Rosen B., et al., "Best Current Practice for Communications Services in Support of Emergency Calling", Internet Engineering Task Force (IETF), Request for Comments: 6881, Mar. 2013, pp. 1-28.
Rosen P., et al., "Framework for Emergency Calling Using Internet Multimedia", Internet Engineering Task Force (IETF), Request for Comments: 6443, Dec. 2011, pp. 1-38.
Schulzrinne H., et al., "Dynamic Host Configuration Protocol (DHCPv4 and DHCPv6) Option for Civic Addresses Configuration Information", Network Working Group, Request for Comments: 4676, Oct. 2006, pp. 1-19.
Thomson M., et al., "Representation of Uncertainty and Confidence in the Presence Information Data Format Location Object (PIDF-LO)", Internet Engineering Task Force (IETF), Request for Comments: 7459, Feb. 2015, pp. 1-39.
Tschofenig H., Ed. et al., "Carrying Location Objects in RADIUS and Diameter," Network Working Group, Request for Comments: 5580, Category: Standards Track, Aug. 2009, 53 Pages.
WBA Openroaming: "The Legal Framework Supporting the Federation", Wireless Broadband Alliance, v.3.0.0, Jun. 2022, 109 pgs.
Wi-Fi Alliance, "Passpoint Specification", Version 3.2.20, 2022, pp. 1-174.
Winter S., et al., "Transport Layer Security (TLS) Encryption for RADIUS", Internet Engineering Task Force (IETF), Request for Comments: 6614, May 2012, pp. 1-22.
Lake, D et al., "[DMM] Emergency 911 Services over Wi-Fi," dmm mailing list, IETF, The Mail Archive, https://www.mail-archive.com/dmm@ietf.org/msg03827.html, Mar. 29, 2023, 4 pages.

(56) References Cited

OTHER PUBLICATIONS

Gundavelli, S., "Civic Location and Geospatial Coordinate Support in IPv6 ND," Cisco, Internet-Draft, Workgroup: 6MAN WG, draft-gundavelli-6man-nd-location-00, published Jul. 12, 2023, 4 pages.
3GPP, "Digital cellular telecommunications system (Phase 2+) (GSM); Universal Mobile Telecommunications System. (UMTS); LTE;" ETSI TS 133 402 V17.0.0, 3GPP, System Architecture Evolution (SAE); Security aspects of non-3GPP. Accesses, Apr. 2022, 73 pages.
Communications Security, Reliability and Interoperability Council VIII (CSRIC), "Report on 911 Service Over WI-FI," Working Group 4: 911 Service Over WI-FI, Mar. 2023, 85 pages.
ECC: "Study of Issues Related to Calls to Emergency Services from Devices that are SIM-less or in Limited Service State (LSS) for Another Reason", ECC Report 324, Nov. 24, 2021, 22 Pages.
ETSI: "Digital Cellular Telecommunications System (Phase 2+) (GSM), Universal Mobile Telecommunications System (UMTS), LTE, 5G, Location Services (LCS), Service description, Stage 1 (3GPP TS 22.071 version 17.0.0 Release 17)", ETSI TS 122 071 V17.0.0, Apr. 2022, 55 Pages.
ETSI: "Emergency Communications (EMTEL); Transporting Handset Location to PSAPs for Emergency Communications—Advanced Mobile Location", ETSI TS 103 625 V1.2.1, Apr. 2022, pp. 1-25.
GSMA: "Emergency Communication Version 1.0 ", NG.119, Jul. 1, 2021, pp. 1-29.
GSMA: "IMS Profile for Voice, Video and SMS over Untrusted Wi-Fi access Version 5.0", IR 51, May 23, 2017, pp. 1-17.
Polk J., et al., "Dynamic Host Configuration Protocol Option for Coordinate-Based Location Configuration Information", Network Working Group, Request for Comments: 3825, Jul. 2004, 13 Pages.
Schulzrinne H., "A Uniform Resource Name (URN) for Emergency and Other Well-Known Services", Network Working Group, Request for Comments: 5031, Jan. 2008, 13 Pages.
Schulzrinne H., "Dynamic Host Configuration Protocol (DHCPv4 and DHCPv6) Option for Civic Addresses Configuration Information", Network Working Group, Request for Comments: 4776, Nov. 2006, 17 Pages.
Tomas B., et al., "WBA OpenRoaming Wireless Federation draft-tomas-openroaming-00", Jun. 13, 2023, 32 Pages.
Examination Report in counterpart European Application No. 23837850.9, mailed Sep. 9, 2026, 7 pages.

* cited by examiner

PROVIDING EMERGENCY TELECOMMUNICATION SERVICES AND APPLICATION DRIVEN PROFILE PRIORITIZATION FOR WIRELESS NETWORK ARCHITECTURES

PRIORITY CLAIM

This application claims the benefit of priority under 35 U.S.C. § 119 to U.S. Provisional Application No. 63/435,360, filed Dec. 27, 2022, and to U.S. Provisional Application No. 63/431,396, filed Dec. 9, 2022, the entirety of which applications are incorporated herein by reference.

TECHNICAL FIELD

The present disclosure relates to network equipment and services.

BACKGROUND

Networking architectures have grown increasingly complex in communications environments, particularly mobile networking environments. In particular, wireless local area networks (WLANs) are offered in many locations, such as malls and large public venues. With increased WLAN coverage in locations, it is important that users having mobile devices connected to WLANs can access and be provided public emergency services via WLAN connections. However, there are significant challenges with providing emergency services via WLANs.

DETAILED DESCRIPTION

Overview

Figure 1:
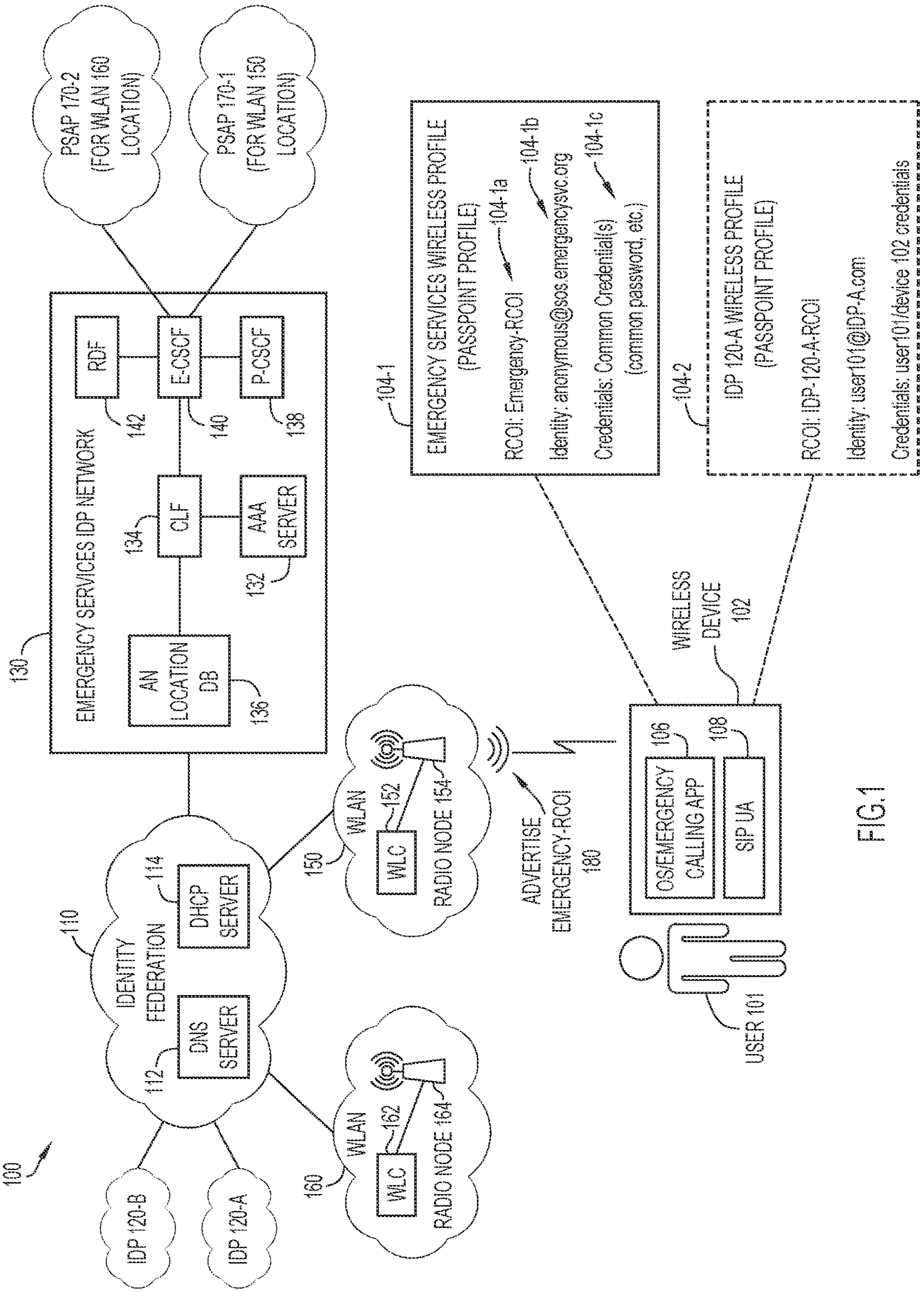
FIG. 1 is a block diagram of a system that may be implemented to facilitate emergency telecommunication services and application driven profile prioritization for a wireless local area network architecture, according to an example embodiment.

Provided herein are embodiments through which emergency telecommunication services and/or application driven profile prioritization may be provided in wireless network architectures, such as wireless local area network (WLAN) architectures and/or, in some embodiments, private cellular architectures, such as private Third Generation Partnership Project (3GPP) Fifth Generation (P5G) architectures.

In at least one embodiment, a computer-implemented method is provided that may include facilitating, for an emergency call initiated by a wireless device, connection of the wireless device with a radio node of a wireless local area network that is associated with a roaming federation comprising a plurality of identity providers, the plurality of identity providers comprising an emergency services identity provider that is to perform authentication for the connection of the wireless device with the radio node for the emergency call; providing a location tag to the wireless device, wherein the location tag is associated with a location of the wireless device; obtaining, by the emergency services identity provider, a session initiation protocol (SIP) registration request message from the wireless device to initiate the emergency call, wherein the SIP registration request message comprises the location tag; determining, by the emergency services identity provider, a location of the wireless device based, at least in part, on the location tag; and facilitating the emergency call for the wireless device with a public safety answering point (PSAP) that is determined based on the location of the wireless device, wherein the location of the wireless device is provided to the PSAP.

Example Embodiments

The United States Federal Communications Commission (FCC) is considering the use of wireless local area network (WLAN) technologies for providing emergency telecommunication services, such as emergency or enhanced 911 (E911) services, when there is no public cellular mobile network coverage (e.g., no public 3GPP Fourth Generation (4G)/Long Term Evolution (LTE) access networks, Fifth Generation (5G) access networks, next Generation (nG) access networks, etc. cellular mobile network coverage) available for mobile devices. In particular, non-proprietary standards that can be utilized over unlicensed access technologies are being considered.

There are various potential issues or elements to be addressed in order to facilitate providing emergency services for WLAN environments, such as Institute of Electrical and Electronics Engineers (IEEE) 802.11 or Wi-Fi environments, and/or for private 5G (P5G) environments, when no public cellular access network coverage is available for wireless devices.

One potential issue involves making telecommunications service provider-owned Wi-Fi access points, and other communications technologies operating on the unlicensed spectrum, available to the general public for access to emergency (e.g., 911) services, without involving any user-specific login credentials, during times of emergency when public mobile (i.e., public cellular) service is unavailable. Another potential issue involves the provisioning by non-telecommunications service provider-owned Wi-Fi access points of public access to 911 services during times of emergency when mobile service is unavailable and/or other alternative means of providing the public with access to emergency telecommunication services during times of emergency when public mobile (public cellular) service is unavailable.

Yet another potential issue involves how to link the prioritization and selection of a federation-based emergency services profile configured for a wireless device, user equipment, or station (STA) that contains configuration information that reflects a user's intent to imminently use an emergency calling application that is to facilitate connection to an emergency services call system. It will be useful to avoid all users that have a configured emergency services profile from "camping on" an emergency services wireless access network.

Another potential issue in the emergency services workflow involves determining the location of an emergency services caller. Emergency response centers must be able to determine the location of a caller in order to dispatch emergency services to the caller. However, in some instances, a caller may be too young, frightened, or confused to provide the location of an emergency. Thus, it would be useful to facilitate automatic location determination by a Public Safety Answering Point (PSAP).

Some current solutions provided for the wireless E911 framework rely on location elements inserted by an endpoint (STA) in Session Initiation Protocol (SIP) registration messages to determine the location of a caller. For example, current 3GPP standards define an Internet Protocol (IP) Multimedia Subsystem (IMS) (sometimes referred to as the IP Multimedia core network Subsystem) that includes an Enhanced or Emergency Call Session Control Function (E-CSCF) that can handle various aspects of emergency sessions for 3GPP mobile network scenarios. Generally, the E-CSCF obtains requests from a proxy CSCF (P-CSCF) and routes the emergency requests/sessions to an appropriate emergency center or PSAP based on a Connectivity Location Function (CLF) (sometimes referred to as a Connectivity session Location and repository Function) and/or Route Determination Function (RDF) (sometimes referred to as a Routing Determination Function) regarding the location of a caller.

A PSAP may be considered a facility at which emergency calls are received under the responsibility of a public or government authority. A conventional CLF can maintain mappings between an endpoint's (wireless device's) dynamically assigned IP address and the endpoint's physical location. Generally, an RDF can provide for resolving a physical location, such as a civic address and/or a geospatial address, to a serving PSAP.

A conventional Emergency Call Session Control Function (E-CSCF) can query a conventional CLF with a public IP address of a SIP user agent (e.g., operating on a wireless device of a user) to recover the location of the SIP user agent/wireless device/user. The E-CSCF then uses this location in its PSAP routing logic. As an extension, some current wireless E911 solutions involve the insertion of location elements, such as Global Positioning System (GPS) coordinates, a Basic Service Set Identifier (BSSID) of a connected access point or civic/geo location elements, in SIP registration messages. For such solutions, using an IP address and BSSID from a SIP registration message can allow an E-CSCF to retrieve the location registered for a given BSSID from a CLF lookup.

However, unlike in public cellular networks (e.g., public 3GPP 4G/LTE, 5G, nG access networks), users on WLAN systems (e.g., 802.11 access networks) and P5G access networks may be allocated private IP addresses. This IP address information can be included in a Remote Authentication Dial-In User Service (RADIUS) authentication exchange, but because the IP address will frequently represent a private IP address, it may not be used to uniquely identify a user.

Additionally, in some instances, such as for a federation-based (e.g., OpenRoaming) architecture, federation-based STA may have a private IP address such that the public IP address observed by the E-CSCF may not correspond to the private IP address signaled via federation signaling. Hence, an established, conventional CLF application that queries using a public IP address may not be used in a federation-based architecture that is to provide emergency telecommunication services.

The OpenRoaming federation makes extensive use of Roaming Consortium Organization Identifiers (RCOIs) for defining polices that are supported by particular access network providers (ANPs) and those policies supported by individual identity providers (IDPs). Generally, an OpenRoaming (OR) architecture is a federation that provides a framework for connecting radio access networks including WLAN (e.g., Wi-Fi) hotspots provided by access network providers (ANPs) with identity providers (IDPs or IdPs). An ANP may be considered any entity providing internet connectivity services via a RAN and an IDP may be considered an entity that manages identity credentials and policies for wireless devices via wireless profiles, such as Passpoint profiles, and provides authentication services for such wireless devices.

An RCOI can be a 3-octet or a 5-octet value that can be carried in an 802.11 beacon information element (IE) and/or can be sent via Access Network Query Protocol (ANQP) messages that can be used to identify the groups or identity providers that are supported by a given network (e.g., a given WLAN). Passpoint is a Wi-Fi Alliance (WFA) protocol through which Passpoint profiles provisioned for wireless devices enable such wireless devices to discover and authenticate to WLAN/Wi-Fi hotspots that provide internet access. A conventional Passpoint profile may include a user's identity and credentials, along with access network identifiers that can enable a user's wireless device to authenticate to an access network.

Supported RCOIs can be provisioned in WLAN equipment by ANPs and can be configured in the Passpoint profile of wireless devices managed by corresponding IDPs. During operation of a wireless device (also referred to interchangeably herein as a 'mobile device', a 'wireless client', station (STA), or variations thereof), an authentication exchange can be triggered with an IDP when there is a match of RCOIs between what is being broadcast by a given WLAN of an ANP and a Passpoint profile configured for a wireless device.

In addition to potential issues that may arise through the use of private IP addresses, in some instances, a rogue device or a compromised device may potentially trigger a volume of emergency calls with each call claiming a location source not representative of a caller's actual location. In such instances, a value set for the field "i-wlan-node-id" included in a Private-Access-Network-Info (PANI or P-ANI) header of a SIP message can potentially be a false BSSID that maps to a different location identified in the CLF database. There is currently no mechanism for a convention E-CSCF or PSAP to identify such attacks or validate the authenticity of a location/location information that may be reported by a wireless device initiating an emergency call.

In order to address such issues, embodiments herein provide approaches for leveraging a federation-based roaming architecture, such as the OpenRoaming federation-based architecture, for IDPs along with Institute of Electrical and Electronics Engineers (IEEE) 802.11 (e.g., Wi-Fi) wireless local area network (WLAN) access network providers and/or P5G access network providers (e.g., enterprise entities such as business/corporate entities, government agencies, universities, institutions, etc.) to support emergency telecommunication services (e.g., emergency 911 (E911 or E-911) services or, in international settings, 999/112 services, etc.) over P5G/WLAN accesses. Broadly, embodiments herein may facilitate an identity federation-based roaming architecture that may enable emergency calling services for wireless devices via P5G/WLAN accesses such that a location of the wireless devices can be securely identified and reported to a PSAP when no public cellular mobile access is available to such wireless devices.

Embodiments herein provide for defining the use of an emergency services access network identifier, such as an emergency-RCOI (E-911-RCOI or E-RCOI), for use in systems in order to support emergency telecommunications services. The emergency services access network identifier or emergency-RCOI as prescribed by embodiments herein may be provided in order to support those users (wireless devices) that may have not been provisioned with a full OpenRoaming credential in their device. An ANP/access network (AN) that has been configured to support emergency telecommunication services and the emergency-RCOI may be able to simultaneously support emergency services calling as well as any conventional federation-based (e.g., OpenRoaming) service and ensure end-users with valid credentials to use such to authenticate using the federation.

Further, embodiments herein provide for application driven wireless profile prioritization such that an emergency calling application, which may be an operating system (OS) provided emergency calling application (referred to herein as an OS/emergency application (app)), configured for wireless devices (which may be the (default) emergency calling application configured for the device) can, upon initiation of the emergency calling application by a user of the wireless device via a user interface (UI) interaction, automatically prioritize, select, and utilize an emergency services wireless profile (e.g., a Passpoint profile) that includes identifies the emergency-RCOI, in lieu of any other wireless profiles that may be configured for the wireless device, in order to connect to an access network (e.g., WLAN) provided by an ANP that broadcasts support for the emergency-RCOI identified in the emergency services wireless profile and perform a federation-based authentication with an emergency services IDP.

Thus, in accordance with embodiments herein, application driven wireless (Passpoint) profile prioritization can be performed by a wireless device based on a likely application triggered by a user/UI for the wireless device. For example, for emergency calling, a conventional wireless device can be configured with an OS/emergency calling application that enables a user to make emergency (e.g., E911) calls. Such user engagement with the OS/emergency calling application indicates an intention to make/initiate an emergency call and can trigger the application driven profile prioritization to facilitate connection of the wireless device to an access network that supports emergency telecommunication services.

In accordance with embodiments herein, a wireless device/STA that is in the coverage of a WLAN but may or may not have valid conventional (OpenRoaming) credentials can use the UI interaction to trigger the selection of the emergency services wireless profile containing the emergency-RCOI. The wireless device is able to use credential(s) contained in the emergency services wireless (Passpoint) profile to authenticate to the WLAN broadcasting the emergency-RCOI. Thus, the emergency services wireless profile can include a non-user-specific or common authentication identity (e.g., "anonymous@sos.emergencysvc.org" or the like) and non-user-specific/common authentication credential(s) to facilitate connection to the WLAN via a RADIUS exchange involving the emergency services IDP (in some instances, both the authentication identity and the authentication credential(s) may be referred to as 'credentials' for the emergency services wireless profile).

3GPP standards define an E-CSCF as always operating in an access network, such that an E-CSCF is always directly linked with an access network or stated differently, is a part of an operator's cellular IMS network, even for emergency evolved Packet Data Gateway (ePDG) scenarios involving untrusted WLAN use cases.

In contrast, embodiments herein propose operating an E-CSCF by an emergency services IDP in which the E-CSCF may be operated as a common function that can be leveraged by all ANPs of an identity federation-based roaming (e.g., OpenRoaming) architecture that have configured the emergency-RCOI. This means that an E-CSCF as prescribed via embodiments herein may not be directly coupled to the access network for which it is to recover network provided location information. Rather, embodiments herein propose to leverage identity federation-based (e.g., OpenRoaming) techniques that can utilize the signaling of civic address and/or geo-spatial location (geo-location) attributes or information (e.g., address information, coordinates, etc.) during a RADIUS exchange between an ANP and the emergency services IDP for an emergency call involving a wireless device such that an E-CSCF may be enabled to later recover the civic address/geo-location attributes that identify/indicate the location of the wireless device as triggered through a SIP registration involving the wireless device for the emergency call such that the E-CSCF can query a CLF, in order to recover the civic address/geo-location attributes that identify/indicate the location of the wireless device.

Embodiments as prescribed herein may further be leveraged for ePDG scenarios in order to enable an E-CSCF behind an ePDG to query a CLF (or, for embodiments in which an AAA is enhanced with CLF functionality, the query can be performed on the AAA/CLF) in order to recover the civic address/geo-location attributes that identify/indicate the location of a wireless device.

Thus, in accordance with embodiments herein, a given WLAN network/ANP is not considered to be offering emergency services, but rather is facilitating an emergency call by providing connectivity to an identity federation, through which emergency service functions (e.g., an E-CSCF, AAA, CLF, etc.) can be contacted. Accordingly, emergency service functions as prescribed by embodiments herein are not tied to any one access network, but rather can be hosted by one entity (e.g., the FCC, the Wireless Broadband Alliance (WBA), etc.) and can provide a common service for users across many access networks.

Accordingly, certain embodiments herein provide for enhancing a CLF operated by the emergency services IDP to allow querying the CLF based on a location tag, referred to herein interchangeably as a secure location tag (SLT) and, in some embodiments, based additionally on a Basic Service Set Identifier (BSSID) that represents the Media Access Control (MAC) address of the WLAN radio node that is serving a given wireless device. The enhanced CLF can maintain mappings between a location tag (SLT) provided to a wireless device initiating an emergency call (and potentially the BSSID of the radio node with which the device is connected) and the wireless device's physical location, which can be determined based on the location of the radio node to which the device is connected.

The location tag (SLT), and optionally BSSID, can be included in a (Private-Access-Network-Info (P-ANI or PANI) SIP header sent by the wireless device initiating an emergency call. The location tag, and optionally BSSID, may also be included in ANP to IDP RADIUS signaling as discussed for embodiments herein.

Further, embodiments herein provide that an emergency services IDP hosting an emergency services realm (e.g., '@sos.emergencysvc.org' or the like) includes support for an enhanced CLF capability that enables the enhanced CLF to be queried by an E-CSCF based on the location tag and, in some instances additionally the BSSID. The emergency services IDP enhanced CLF can then match the location tag (SLT), and optionally BSSID in some instances, with that received in RADIUS messages originated from individual ANPs and return corresponding location attributes that identify/indicate the location of the wireless device to the E-CSCF.

Although some embodiments herein are discussed with reference to wireless devices that may not have valid (OpenRoaming) credentials (e.g., to perform a federation-based authentication with a non-emergency services identity provider), it is to be understood that embodiments herein may be equally applicable to scenarios in which wireless devices may have valid WLAN credentials. In some instances, embodiments herein may find applicability to scenarios in which wireless devices may be in the coverage of a public cellular access network.

Further, although certain embodiments herein are discussed with reference to use of the location tag, and optionally a BSSID along with the location tag in order to determine a wireless device's physical location, in some embodiments, a wireless device may include only a BSSID in a SIP (P-ANI) header (e.g., for wireless devices that may not be capable of performing location tag operations as discussed herein) through which the CLF can be queried to identify the physical location of the wireless device. In such "BSSID-only" embodiments, other security mechanisms may be provided in the system in order to prevent potential rogue attacks from devices that may be reporting false BSSIDs.

Referring to FIG. 1, FIG. 1 is a block diagram of a system 100 that may be implemented to facilitate emergency telecommunication services and application driven profile prioritization, according to various example embodiments. As illustrated in FIG. 1 system 100 may include a wireless device 102 that is operated by a user 101. The wireless device 102 may be configured or otherwise provisioned with one or more wireless profiles, such as Passpoint profiles, which are discussed in further detail herein, below.

Also shown in FIG. 1 is an identity federation 110 (also referred to herein as identity federation entity), a number of wireless local area networks (WLANs), including a WLAN 150 and a WLAN 160, a number of IDPs, including an IDP 120-A and an IDP 120-B, an emergency services IDP network 130 (also referred to herein interchangeably as "emergency services IDP 130"), and a number of PSAPs, such as a PSAP 170-1 and a PSAP 170-2.

In at least one embodiment, a Domain Name System (DNS) server 112 and a Dynamic Host Configuration Protocol (DHCP) server 114 may be provided by the identity federation 110 (e.g., via any appropriate network, system, etc.). Although shown in relation to identity federation 110, it is to be understood that DNS server 112 and DHCP server 114 may be configured via any other network of system 100.

Each WLAN 150 and 160 may include any number of radio nodes (sometimes referred to as access points, wireless access points, Wi-Fi access points, or the like). In at least one embodiment, such radio nodes may be managed/operated or otherwise controlled via a corresponding wireless LAN controller (WLC), such as a radio node 154 configured for WLAN 150, which may be operated by a WLC 152, and a radio node 164, which may be controlled via a WLC 162 for WLAN 160. Although certain embodiments herein may be discussed with reference to WLC control of radio nodes for a WLAN, it is to be understood that embodiments herein may be equally applicable to controller-less WLAN implementations.

Emergency services IDP network 130 may include a Remote Authentication Dial-In User Server (RADIUS) server, such as an Authentication, Authorization, and Accounting (AAA) server 132, a Connectivity Location Function (CLF) 134, an access network (AN) location database (DB) 136, a proxy-Call Session Control Function (P-CSCF) 138, an emergency or enhanced-Call Session Control Function (E-CSCF) 140, and a Route Determination Function (RDF) 142. PSAP 170-1 may be considered the serving PSAP for civic/geographic locations covered, at least in part, by WLAN 150 and PSAP 170-2 may be considered the serving PSAP for civic geographic locations covered, at least in part, by WLAN 160.

AAA server 132 may support authentication for an emergency telecommunication services realm (e.g., "@sos.emergencysvc.org" or the like) and policies for an emergency-RCOI, as discussed in further detail herein. P-CSCF 138 and E-CSCF 140 may collectively be referred to herein as P/E-CSCF server 138/140 and may be considered a dedicated P/E-CSCF provided via emergency services IDP network 130 in order to support emergency telecommunication services via IP Multimedia Subsystem (IMS) protocols, such as 3GPP TS 24.229.

In at least one embodiment, emergency services IDP network 130 may be managed by a government/emergency services provider, such as the FCC, or the like, or may be provided by any third-party providers (e.g., IDP-as-a-service (IDPaaS) providers, MNO providers, voice service providers, standards-based providers (e.g., the WBA), and/or the like may host these services on the behalf of a government or emergency service provider. In some embodiments, enterprise providers may also be able to provision this profile along with other enterprise policies over mobile device management (MDM) operations.

Generally, identity federation 110, including DNS server 112 and DHCP server 114, may interface with IDPs, such as IDP 120-A and IDP 120-B, WLANs 150 and 160, and emergency services IDP network 130, which may further interface with PSAP 170-1 and PSAP 170-2. Each of WLAN 150 and WLAN 160 may further interface with emergency services IDP network 130 via network connectivity/communications facilitated via identity federation 110. Regarding emergency services IDP network 130, AAA server 132 may interface with CLF 134, which can further interface with AN location DB 136 and E-CSCF 140. E-CSCF 140 may further interface with P-CSCF 138, RDF 142, PSAP 170-1, and PSAP 170-2. Although illustrated in FIG. 1 as separate network elements, in some embodiments, the AAA server 132 may be enhanced to include functionality of CLF 134 in order to facilitate a combined AAA server/CLF 132/134.

For the embodiment of FIG. 1, WLANs 150 and 160 may each be operated by a corresponding ANP and the IDPs, including IDP 120-A, IDP 120-B, and emergency services IDP network 130 may collectively be considered a federation-based (or identity federation-based) roaming architecture facilitated via identity federation 110 involving identity federation-enabled signaling endpoints. Thus, WLAN 150 may be referred to as an ANP and WLAN 160 may also be referred to as another ANP in accordance with embodiments herein. In one embodiment, identity federation 110 may be implemented as an OpenRoaming federation entity involving OpenRoaming enabled signaling endpoints. The signaling communication between peers of WLAN 150, WLAN 160, and any of IDPs 120-A, 120-B, and emergency services IDP network 130 can be secured using mutual authentication based on the certificates issued under the WBA private PKI (public key infrastructure) operations.

Generally, an identity federation-based roaming architecture, such as an OpenRoaming architecture, may provide a federated wireless access service operated under the WBA framework. Such an identity federation-based roaming architecture may provide seamless onboarding of devices across participating access networks and identity providers. Thus, an identity federation-based roaming architecture, such as the OpenRoaming architecture, as facilitated via embodiments herein can include multiple access network providers and multiple identity providers to enable emergency telecommunication services.

Generally, for an identity federation-based architecture, end users/wireless devices that have been provisioned with a full wireless (e.g., OpenRoaming/Passpoint) profile can successfully authenticate onto a federation-based access network facilitated by an ANP using a standard IDP provisioned profile and (OpenRoaming) RCOI. For example, in at least one embodiment, an IDP 120-A wireless profile 104-2 can be configured for wireless device 102 by IDP 120-A includes an identity and credentials for user 101/wireless device 102 that may facilitate connection/authentication of wireless device 102 to a WLAN using the wireless profile.

To facilitate emergency telecommunication (calling) services, embodiments herein broadly propose the use of a new emergency-Roaming Consortium Organizational Identifier (RCOI) that is defined for emergency use. Such an emergency-RCOI can be referred to herein as an "E-911-RCOI" or "E-RCOI," however, it is to be understood that any emergency-RCOI may be utilized in accordance with embodiments herein.

An emergency-RCOI may be any unique 3-octet or 5-octet value or string that can be used by a wireless device (e.g., wireless device 102) to uniquely identify an access network (e.g., WLAN 150) that supports emergency telecommunication (calling) services in accordance with embodiments herein.

Access networks (ANPs) that are part of the roaming federation provided via identity federation 110 and that support the emergency-RCOI, such as WLAN 150, can configure the emergency-RCOI on WLAN equipment, such as on radio node 154 and/or WLC 152. In some embodiments, WLAN equipment providers can augment existing OpenRoaming provisioning interfaces with emergency-RCOI settings. Thus, an access network, such as WLAN 150, may allow any wireless devices that may not have access credentials for authenticating with a traditional IDP, such as IDP 120-A, to connect to the access network for emergency calling.

For various operations that may be performed via system 100 in order to facilitate emergency telecommunication services and application driven profile prioritization, consider FIGS. 2A, 2B, 2C, and 2D, which are a message sequence diagram 200 illustrating various operations that may be performed to facilitate emergency telecommunication services and application driven profile prioritization for system 100 of FIG. 1, according to various example embodiments.

Figure 2A:
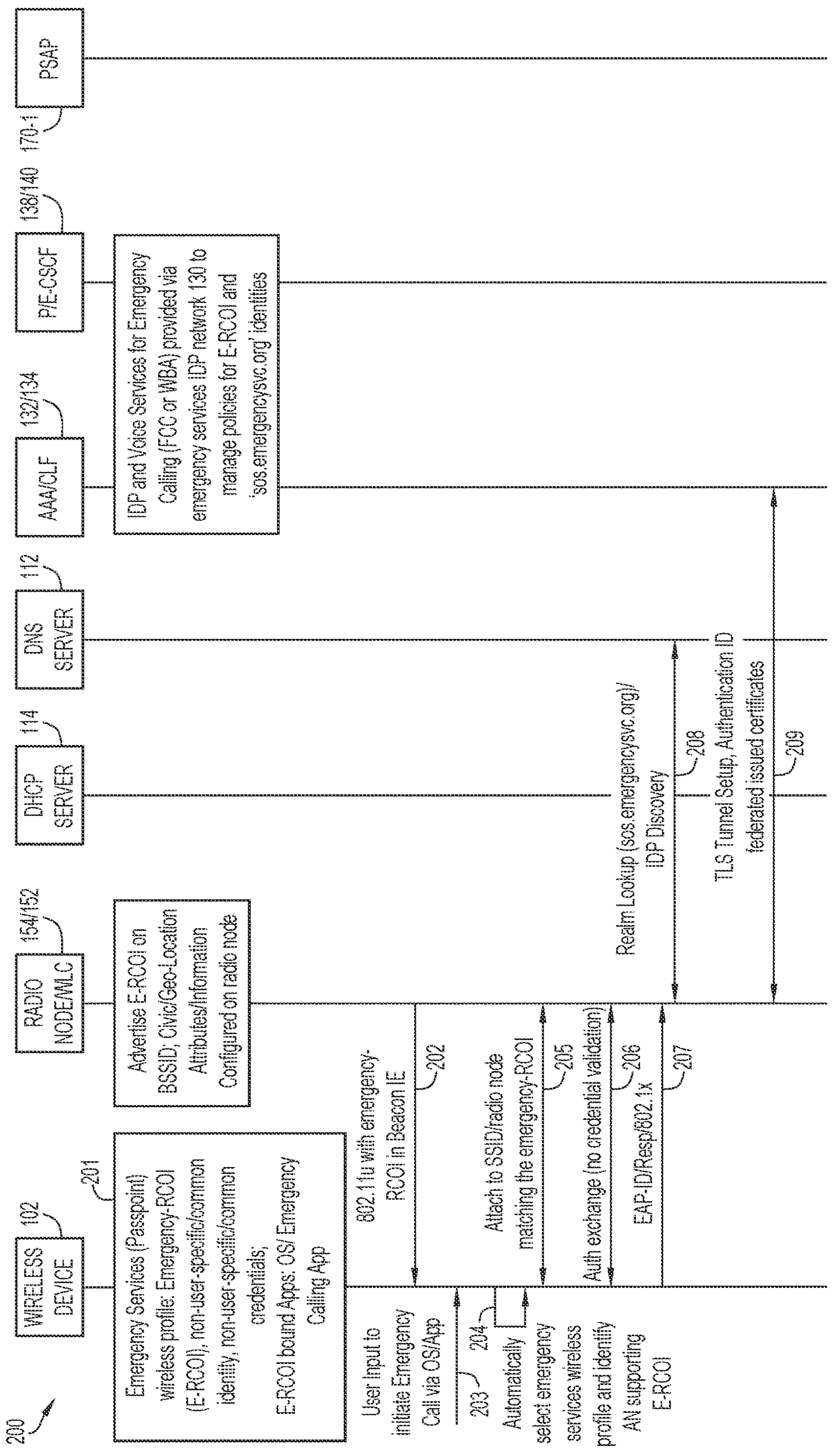
FIGS. 2A, 2B, 2C, and 2D are a message sequence diagram illustrating various example operations that may be performed in order to facilitate emergency telecommunication services and application driven profile prioritization for the system of FIG. 1, according to an example embodiment.
Figure 2B:
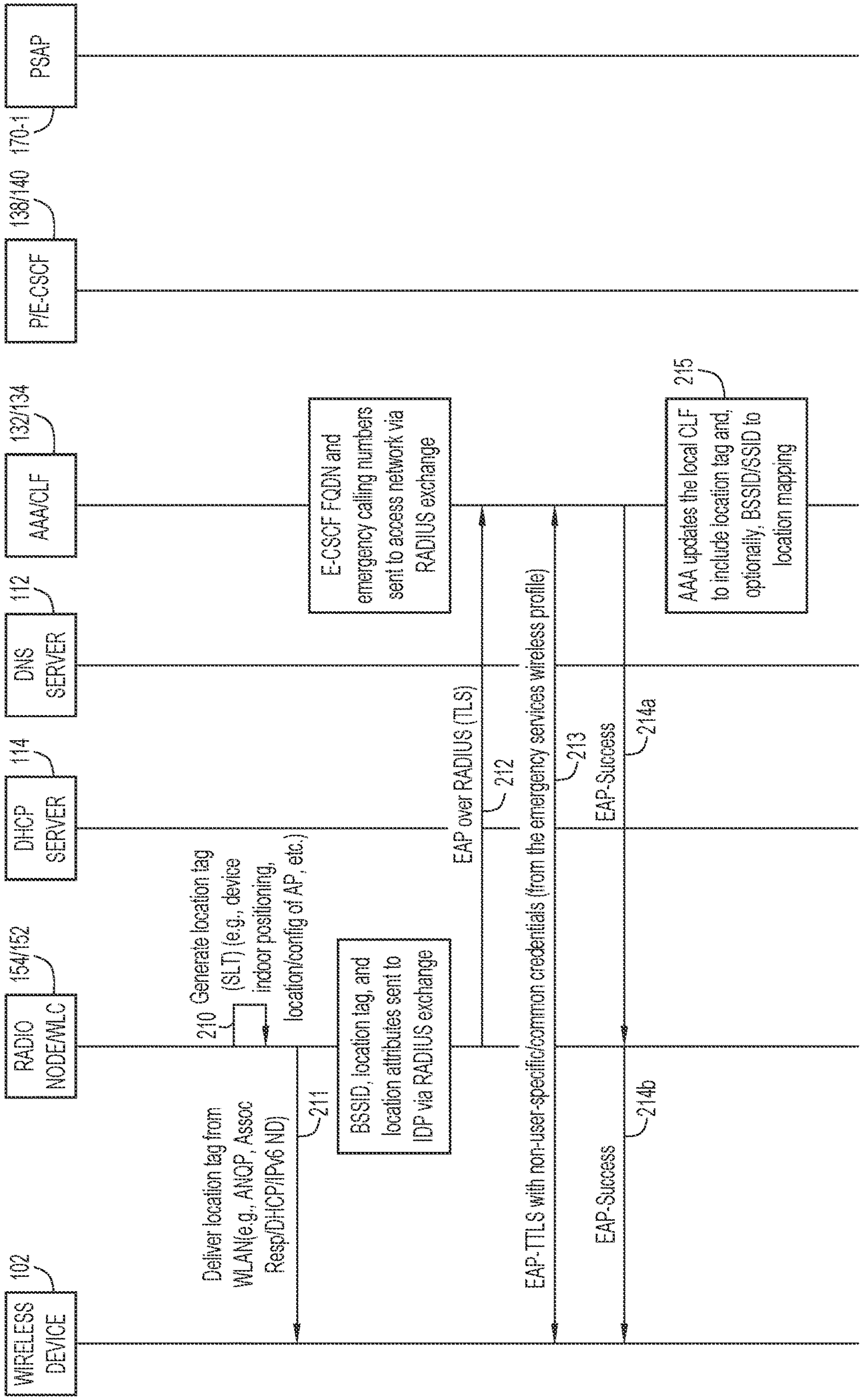

FIGS. 2A,2B, 2C, and 2D include wireless device 102, DNS server 112, DHCP server 114, radio node/WLC 154/152 of WLAN 150, and PSAP 170-1. Also shown in FIGS. 2A and 2B are AAA server/CLF 132/134 (which may be a combined entity or collocated with each other) and P/E-CSCF 138/140 of emergency services IDP network 130. Various features/operations of system 100 may be discussed herein with reference to FIGS. 1, 2A, and 2B.

During operation, consider that WLAN 150, via radio node 154 is configured to support the emergency-RCOI (E-RCOI) and broadcasts or otherwise advertises support of emergency telecommunication (calling) services by broadcasting/advertising the emergency-RCOI (E-RCOI) via radio node 154, as generally shown at 180 of FIG. 1. In various embodiments, such emergency-RCOI broadcasts/advertisements may be provided via any combination of 802.11 beacon messages (e.g., 802.11u signaling including the emergency-RCOI in a beacon information element IE on the BSSID of radio node 154) and/or via any Access Network Query Protocol (ANQP) query/response exchanges between wireless device 102 and radio node 154 related to supported services, etc., as generally illustrated at 202 of FIG. 2A.

In one embodiment, OpenRoaming specifications may be enhanced to ensure that those ANPs that broadcast the emergency-RCOI do so on a separate WLAN such that WLANs may include the Public Land Mobile Network (PLMN) identifiers (PLMN-IDs) in their beacons. A conventional Passpoint-defined Home Service Provider (SP) Preference can be used to ensure that users with valid OpenRoaming credentials (e.g., IDP 120-A wireless profile 104-2 to facilitate authentication with IDP 120-A) do not select the emergency-RCOI WLAN.

In accordance with embodiments herein, end devices, such as wireless device 102 operated by user 101, can be preconfigured with an emergency services wireless profile 104-1, as shown in FIG. 1 and as generally illustrated at 201 of FIG. 2A. In at least one embodiment, the emergency services wireless profile 104-1 may be implemented as a Wi-Fi Alliance emergency services Passpoint profile.

The emergency services wireless profile 104-1 may be configured to include the emergency-RCOI (e.g., E-911-RCOI or E-RCOI) 104-1*a*. The emergency services wireless profile 104-1 may also be configured to include a non-user-specific or common authentication identity 104-1*b* (i.e., an identity that is common to or the same for all devices being configured with the emergency services profile), such as "anonymous@sos.emergencysvc.org," "anonymous@sos.fcc.org." or any appropriate (commonname@realm) non-user-specific/common identity. Additionally, the emergency services wireless profile 104-1 may be configured to include at least one common authentication credential 104-1*c* (i.e., common authentication credential(s), such as a common password, a common certificate, etc. that is/are common to or the same/shared among all devices being configured with the emergency services profile), that can be utilized by any user to initiate an emergency call. During operation, an emergency services wireless profile, such as the emergency services wireless profile 104-1 can allow wireless devices, such as wireless device 102, to automatically discover and connect to access networks (ANPs) that support emergency telecommunication services.

In some instances, the term 'credentials' can be used to collectively refer to an authentication identity and authentication credentials for a wireless profile. Generally, credentials in authentication context allow an endpoint to present a user's identity and some secret element that a device shares with the network (e.g., a password, certificates, etc.). However, in accordance with embodiments herein shared credentials, which broadly in some instance can include a common identity and common credentials (e.g., username: Emergency-Caller; Password: e911), do not identify a specific user, as they are common (non-user-specific) credentials. Common credentials can be configured for wireless devices utilizing various techniques.

In some embodiments, wireless device ecosystem vendors can pre-configure the emergency services wireless profile 104-1 into wireless device 102 at the time of manufacturing or can push an updated profile using established carrier-bundle based provisioning. In some embodiments, if wireless device 102 is an enterprise managed device, enterprise information technology (IT) functionality for the enterprise entity managing the device may also be able to provision the emergency services wireless profile 104-1 into wireless device 102 along with other enterprise policies over MDM procedures. The provisioned emergency services wireless profile 104-1 is common for all devices that may utilize emergency services via the system 100 of FIG. 1. Stated differently, the emergency services wireless profile 104-1 may be referred to as an Emergency Services Passpoint profile that includes two key elements: a) a network identifier that can be used to identify a network that supports emergency telecommunication (calling) services; and b) Common (non-user-specific) Credentials, which in some instances can be inclusive of both a common username/identity and common authentication credentials (e.g., password, certificate(s), etc.). Based on the network identifier being the emergency-RCOI and the credentials being common credentials, the profile is therefor considered a common profile. Thus, the emergency services wireless profile 104-1 allows any device with the emergency services wireless profile 104-1, to discover access networks that support emergency telecommunication services and be able to use the network for emergency calls.

An OS/emergency calling application 106 (app) can be configured for wireless device 102 in which the OS/emergency calling application 106 can include any application logic that enables the wireless device 102 to prioritize and select a federation-based emergency services wireless profile, such as the emergency services wireless profile 104-1 configured for the wireless device 102, upon user 101 interacting with or engaging the OS/emergency calling application 106 for the wireless device 102 such that the wireless device 102 can automatically initiate connection with an access network (AN), such as WLAN 150, that supports federation-based telecommunication services.

A SIP user agent (UA) 108 may also be configured for wireless device 102, in accordance with RFC 3262, in order to facilitate emergency calling. As discussed in further detail herein, during operation, the SIP UA 108 may be able to discover emergency voice or telecommunication services and related configuration information from an access network with which wireless device is connected for an emergency call via communications involving the emergency services IDP network 130. For example, the SIP UA 108 use a P/E-CSCF configuration for P/E-CSCF 138/140 obtained from emergency services IDP network 130 via WLAN 150 in order to perform an emergency call in accordance with embodiments herein. Although certain embodiments herein, such as discussed with reference to FIGS. 2A-2D, are discussed with reference to SIP-based communications for various emergency calling operations, it is to be understood that embodiments as discussed herein may be extended/leveraged for use with any voice calling services and, thus, are not limited to SIP-based communications. Any other agents, functions, logic, etc. may be configured for a wireless device and/or a given communication system in order to facilitate emergency calling operations involving any other communication protocols utilizing the techniques as discussed and/or taught via embodiments herein.

Consider, for example, that user 101 provides a user input, as generally illustrated at 203 of FIG. 2A, via a user interface (UI) of wireless device 102 provided via the OS/emergency calling application 106 in order to trigger an emergency call being initiated by wireless device 102. In at least one embodiment, the user input to initiate or trigger the emergency call may include selecting an "Emergency Call" button, by dialing an emergency phone number (e.g., 911, 112, etc.) or the like via a UI provided by the wireless device 102 via the OS/emergency calling application 106.

In the present example, it is assumed that wireless device 102 is not currently connected to a public cellular access network prior to the user 101 providing the user input to initiate the emergency call. Further for the present example, it is assumed that wireless device 102 is within the coverage area of WLAN 150/radio node 154 but may not have any valid access network credentials (e.g., not configured with another, non-emergency services IDP, provided wireless profile) that may otherwise facilitate connection of the wireless device 102 to WLAN 150.

As noted above, although some embodiments herein are discussed with reference to wireless devices that may not have valid (OpenRoaming) credentials (e.g., to perform a federation-based authentication with a non-emergency services identity provider), it is to be understood that embodiments herein may be equally applicable to scenarios in which wireless devices may have valid WLAN credentials. In still some instances, embodiments herein may find applicability to scenarios in which wireless devices may be in the coverage of a public cellular access network.

Thus, embodiments herein may be utilized in a variety of network environments. For example, one environment may encompass telecommunications service provider-owned Wi-Fi access points in which other communications technologies may be operating on unlicensed spectrum, available to the public for access to emergency calling services, without requiring traditional login credentials, during times of emergency, when mobile service is unavailable. Another environment may encompass non-telecommunications service provider-owned Wi-Fi access points of public access to emergency calling services when mobile service is unavailable. Yet another environment may encompass other alternative means of providing the public with access to emergency calling services during times of emergency when mobile service is unavailable. Accordingly, embodiments herein may be utilized in a variety of different network environments.

Returning to the present example, upon receiving the user 101 input (203) via the OS/emergency calling application 106, the wireless device 102 can automatically identify and select the emergency services wireless profile 104-1 to utilize for the emergency call. Upon selecting the emergency services wireless profile 104-1 for the emergency call, wireless device 102 via the OS/emergency calling application 106 identifies the emergency-RCOI contained in the emergency services wireless profile 104-1 in order to discover/identify an access network that supports emergency telecommunication services based on such an access network broadcasting/advertising the emergency-RCOI (e.g., broadly, an emergency services access network identifier).

For example, as generally illustrated at 204, upon receiving the user 101 input (203), the wireless device 102, via the OS/emergency calling application 106, can automatically identify and select the emergency services wireless profile 104-1 to use for the emergency call and then can identify the emergency-RCOI (E-RCOI) broadcast/advertised via WLAN 150/radio node 154 (180) in order discover and initiate connection with radio node 154 for initiating the emergency call. For example, as shown at 205, wireless device 102 can initiate a network-attach with the Service Set Identifier (SSID)/radio node 154 broadcasting the matching emergency-RCOI for emergency-call access. If the device is already connected to Wi-Fi over a BSSID possibly selected due to an RCOI that does not support emergency services (e.g., an RCOI contained in IDP 120-A wireless profile 104-2), the operations at 205 may include re-selection of the WLAN 150/radio node 154 supporting the emergency-RCOI.

As noted above, location of a given caller/wireless device is a key element in the emergency telecommunication services workflow. Emergency response centers (e.g., a PSAP) should be able to determine the location of a given caller before service is dispatched. However, a caller may be too young, frightened or confused to provide the location of emergency. Therefore, automatic location determination for a wireless emergency services caller may be advantageously provided in accordance with embodiments herein in which the location of the wireless caller can be provided to a PSAP selected to handle the emergency call.

In accordance with embodiments herein, WLANs supporting emergency telecommunication services can be provided a civic location (e.g., civic address) or the geo-spatial location/coordinates of a given caller/wireless device initiating an emergency call or of the radio node (AP) to which the wireless device initiating the emergency call is connected. Reliance on Global Positioning System (GPS) coordinates may not be an option for some indoor environments; however, embodiments herein may include the use of GPS coordinates being utilized for location attributes. In various embodiments, radio node 154 may be manually configured with location attributes such as the civic address of the location/venue at which radio node 154 is located (e.g., street address, floor, suite, etc.) and/or the geo-Spatial coordinates/location of radio node 154 or of a given wireless device (e.g., wireless device 102) that initiates connection with radio node 154 for the emergency call and/or may be able to derive such location attributes through other techniques.

For example, in some embodiments, a radio node/access point operating in the 6 Gigahertz (GHz) Standard Power mode may include its geo-location in the spectrum grant requests sent for Automated Frequency Coordination (AFC) operations. In still some embodiments, a radio node/access point can learn such location attributes from a connected Ethernet switch, from a broadband service provider network, and/or the like. In still some embodiments, any radio node/access point supporting indoor localization services may be able to learn or provide such location information (for itself and/or a wireless device). In still some embodiments, broadband service providers and/or hotspot venue operators may provide civic-location and/or geo-spatial/geo-location coordinates of a given venue.

During operation in at least one embodiment, location signaling as prescribed by OpenRoaming may be used by radio node 154 in order to provide location attributes that identify a location associated with wireless device 102, such as the civic address and/or the geo-spatial coordinates of wireless device 102 initiating the emergency call and/or of the radio node (to which the wireless device 102 is connected), to the emergency services IDP network 130 for CLF 134 population of the AN location DB 136 through authentication exchanges for an authentication process involving wireless device 102.

As noted, embodiments herein provide for the ability to support emergency calls for users without valid credentials to fully authenticate to a WLAN, such as WLAN 150. For example, the non-user-specific/common credential(s) of emergency services wireless profile 104-1 issued by the emergency services IDP can be designated to support emergency calling for users without full credentials.

3GPP standards have defined an approach that uses a 3GPP defined vendor specific Extensible Authentication Protocol (EAP) method called EAP-3GPP-LimitedService for supporting devices without credentials. However, this vendor-specific EAP method is not widely supported.

Embodiments herein provide for defining the re-use of the well supported EAP-TTLS (EAP-Tunneled Transport Layer Security) process with a common set of credential(s), as may be provided via the emergency services wireless profile 104-1, that can be used by wireless device 102 that may seek access on the emergency-RCOI via WLAN 150. In one embodiment, the EAP-Identity for wireless device 102 may be specified as "anonymous@sos.emergencysvc.org" (or any other appropriate "commonname@realm" authentication identity) with the common authentication credential(s) of the emergency services wireless profile 104-1 being used in the EAP inner method (i.e., the EAP exchange consisting of an outer method involving a common network address identifier (NAI) that only exposes the realm to the access network (e.g., sos.emergencysvc.org) that is used to setup a TLS tunnel (which hides identity exposure to the access network) in which the tunnel, via the inner method, is used to send a further identity that is protected between the supplicant (e.g., wireless device 102) and an EAP-Server (e.g. AAA server 132)).

As shown at 206, wireless device 102 can initiate an initial (EAP) authentication message exchange with radio node 154. As shown at 207, wireless device 102 sends an EAP identity (EAP-ID), EAP-ID response, or 802.1x authentication message including the common/default authentication identity 104-1*b*, "anonymous@sos.emergencysvc.org" (or other similarly defined emergency services 'name@realm', which for the emergency services involves a common/non-user-specific NAI) from the emergency services wireless profile 104-1.

OpenRoaming provides for dynamically discovering signaling peers used to authenticate end-users using DNS operations. In at least one embodiment, similar approaches may be utilized by ANPs, such as WLAN 150, in order to discover the signaling systems, such as emergency services IDP network 130 that are to be used to support the EAP-server for the "@sos.emergencysvc.org" realm, such as AAA server 132.

For example, as shown at 208, radio node 154/WLC 152 may perform a realm lookup via DNS server 112 using the realm portion of the EAP-ID sent by wireless device 102 (e.g., sos.emergencysvc.org") in order to identify the AAA server 132 for emergency services IDP network 130 supporting EAP authentication for the emergency-RCOI and the realm.

Following the emergency services IDP discovery at 208, the radio node 154/WLC may perform tunnel establishment with the AAA server 132, as generally shown at 209, in order to establish a secure Transport Layer Security (TLS) tunnel with the AAA server 132 for securing 802.1x/EAP traffic that is to be exchanged between the wireless device 102 and the emergency services IDP network 130/AAA server 132.

In at least one embodiment, authentication of the peers (radio node 154/WLC 152 and AAA server 132) may be based on OpenRoaming federation issued X.509 certificates. Further, OpenRoaming defines the RADIUS messages exchanged between an ANP and an IDP. These include the "offered-service" vendor specific attribute as well as Internet Engineering Task Force (IETF) Request for Comments (RFC) 5580 defined location attributes.

Thus, embodiments herein include defining a new value for the offered-service attribute, such as "openroaming-emergency" or the like in order to unambiguously indicate that the authentication for wireless device 102 has been sent from WLAN configured with the emergency-RCOI, such as WLAN 150 in this example.

As discussed in further detail below with reference to communications at 212, 213, 214*a* and 214*b*, the wireless device 102 is to complete the EAP authentication with AAA server 132 using the common authentication credential(s) 104-1*c* of the emergency services wireless profile 104-1. Thus, the AAA server 132 (e.g., EAP server), can use the common credential(s) of the emergency services wireless profile 104-1 in order to authenticate user 101/wireless device 102 onto WLAN for instances in which the wireless device may or may not have valid identity federation (e.g., OpenRoaming) credentials to otherwise connect to WLAN 150. 802.1x/EAP messages for the authentication exchange can be tunneled as RADIUS messages between the radio node 154 and the AAA server 132.

However, before discussing further details of the EAP authentication, it is important to note again that determining the location of a given caller/wireless device is a key element in the emergency telecommunication services work-flow. Automatic location determination for a wireless emergency services caller, such as wireless device 102, may be advantageously provided in accordance with embodiments herein in which the location of the wireless caller can be provided to a PSAP selected to handle the emergency call.

Moreover, embodiments herein not only provide for automatic location determination, but also provide for validating the authenticity of location information reported by a wireless device initiating an emergency call through use of a location tag, also referred to herein as a secure location tag (SLT). Thus, following activation of the OS/emergency calling application 106 and connection with the radio node 154/WLAN 150 that supports federation-based emergency telecommunication services, the location tag, can be delivered or otherwise provided to the wireless device 102.

Thus, in order to facilitate automatic location determination for wireless device 102 and to validate the authenticity of location information reported by the wireless device in initiating the emergency call, radio node 154 can generate a location tag for wireless device 102, as shown at 210 of FIG. 2B, and can deliver the location tag to the wireless device 102, as shown at 211.

In at least one embodiment, the location tag may be similar to a One Time Password (OTP) in that the location tag (SLT) may be a dynamically generated string (potentially an alpha-numeric string, such as "location-tag<LOC123XYZ>" or any other string) having a lifetime validity that may not exceed the authorized session lifetime for a given IDP, such as the emergency services IDP/IDP network 130.

In some embodiments, a location tag can be dynamically generated to be unique for each wireless device connecting to a given WLAN supporting emergency telecommunication services, such as WLAN 150. In still some embodiments, a location tag can be generated such that it can be common to all wireless devices connecting to a given radio node (and location thereof) of a given WLAN supporting emergency services at a given point in time, such as connecting to radio node 154 of WLAN 150 at a given point in time.

Thus, in various embodiments, a location tag (SLT) may be representative of the location of a given wireless device, such as wireless device 102, or may be representative of the location of the radio node with which a wireless device is connected for an emergency call, such as radio node 154 with which the wireless device 102 is connected for the present example.

OpenRoaming defines RADIUS messages that can be exchanged between ANP and an IDP, which can include RFC 5580 defined location attributes. The signaled location attributes can identify the location of a given access point and/or can be personalized to identify the location of a given device based on indoor localization techniques.

In accordance with embodiments herein, a new attribute can be defined for carrying a location tag (SLT) generated/provided to a wireless device initiating an emergency call such that the location tag, along with reported location attributes that identify the location associated with the wireless device can be exchanged between an ANP, such as radio node 154/WLAN 150, and the emergency services IDP network 130, through various authentication (RADIUS) exchanges involving a wireless device, such as wireless device 102.

The location tag can be used as a key for retrieving a location (e.g., civic address, geo-spatial coordinates, etc.) for a given wireless device or radio node, such as wireless device 102 or radio node 154, upon the E-CSCF 140 obtaining a SIP registration message from the wireless device 102 containing the location tag. As discussed below with reference to operation 215, at the completion of the authentication of the wireless device 102, the AAA server 132 can update the collocated CLF 134 with the location tag and location attributes that identify the location associated with the wireless device 102 (e.g., civic address/geo-location coordinates, etc.) obtained via the RADIUS exchange such that the location tag and location attributes can be stored in the AN location DB 136. Thus, the location tag may serve as an index in the CLF 134 for the caller's (wireless device 102) location. In various embodiments, the location tag can be used alone or in combination with an identifier of the radio node 154 to which the wireless device 102 is connected, such as BSSID (e.g., that represents the MAC address of radio node 154), and potentially SSID, for the E-CSCF 140 to perform a lookup via the CLF 134 to determine a location of wireless device 102. Using BSSID in conjunction with SSID can offer greater security.

The location tag (SLT) can be delivered to the wireless device 102 at 211 using a variety of communications, such as via an ANQP exchange request/response exchange with the wireless device 102, via an 802.11 Association Response sent to wireless device 102, through a DHCP exchange involving wireless device 102, via an IP version 6 (IPv6) Neighbor Discovery (ND) Router Advertisement (RA) involving wireless device 102, and/or the like. For example, in at least one embodiment, wireless device 102 can send an ANQP query to radio node 154 and an ANQP response sent from the radio node 154 to wireless device 102 can include the location tag. In another embodiment, the radio node 154 can include the location tag in an 802.11 Association Response sent to wireless device. In another embodiment, the radio node 154 and/or WLC 152 can send the location tag to the wireless device 102 via a newly defined DHCP option through client address assignment procedures involving wireless device. In another embodiment, a new option can be defined for inclusion in an IPV6 Router Advertisement in which the location tag can be sent to the wireless device 102 via the Router Advertisement.

The identifier of radio node 154, such as BSSID (and potentially SSID), along with the location tag (SLT), and location attributes that identify the location associated with the location of wireless device 102 (e.g., civic/geo-spatial location/coordinates for the location of radio node 154 or the location of wireless device 102 itself) can be sent to the AAA server 132/emergency services IDP network 130 via the authentication (RADIUS) exchange for wireless device 102. Further, the AAA server 132 can provide to the radio node 154/WLC 152 via the authentic (RADIUS) exchange involving wireless device 102 emergency voice calling (IMS) configuration information, such as a Fully Qualified Domain Name (FQDN) and/or IP address of the E-CSCF 140 and at least one emergency calling number that the wireless device can utilize to perform the emergency call.

For example, as shown at 212, radio node 154 can initiate an EAP authentication for wireless device 102 with the AAA server 132 over RADIUS via the TLS tunnel previously established with the AAA server 132. Along with conventional EAP-based information to initiate the authentication, the signaling towards the AAA server 132 can include the identifier of radio node 154, such as BSSID (and potentially SSID), along with the location tag (SLT), and location attributes that identify the location associated with the location of wireless device 102. In at least one embodiment, the radio node 154 can include the BSSID in a Calling-Station-Id attribute (e.g., as prescribed by RFC 2865) and the location tag (SLT) can be included in a newly defined attribute. In at least one embodiment, the location attributes that identify the location associated with the location of the wireless device 102 (e.g., civic/geo-spatial location/coordinates for the location of radio node 154 or the location of wireless device 102 itself) can be included in RFC 5580 defined location attributes (e.g., in attribute 127/128).

Thereafter, as shown at 213, an EAP-TTLS authentication exchange can be carried out between wireless device 102 and the AAA server 132 using the non-user-specific/common credential(s) contained in the emergency services wireless profile 104-1. Upon a successful EAP transaction/authentication being performed for the wireless device 102, an EAP-SUCCESS message can be sent from the AAA server 132 toward wireless device 102 via radio node 154 in which the EAP-SUCCESS message sent to radio node 154, as shown at 214*a*, can include the emergency voice calling (IMS) configuration information, such as the FQDN of the E-CSCF 140 and at least one emergency calling number that the wireless device 102 can utilize to perform the emergency call. The EAP-SUCCESS message can be further transmitted to the wireless device 102 (without the emergency voice calling configuration information), as shown at 214*b*.

As shown at 215, the AAA server 132 updates the CLF 134, which in turn updates the AN location DB 136 (not shown in FIG. 2B), with a mapping that correlates the location tag, and optionally the BSSID (and, if applicable, the SSID), with the location attributes that identify the location associated with the location of wireless device 102 that are obtained by the AAA server 132 via the EAP authentication exchange.

Figure 2C:
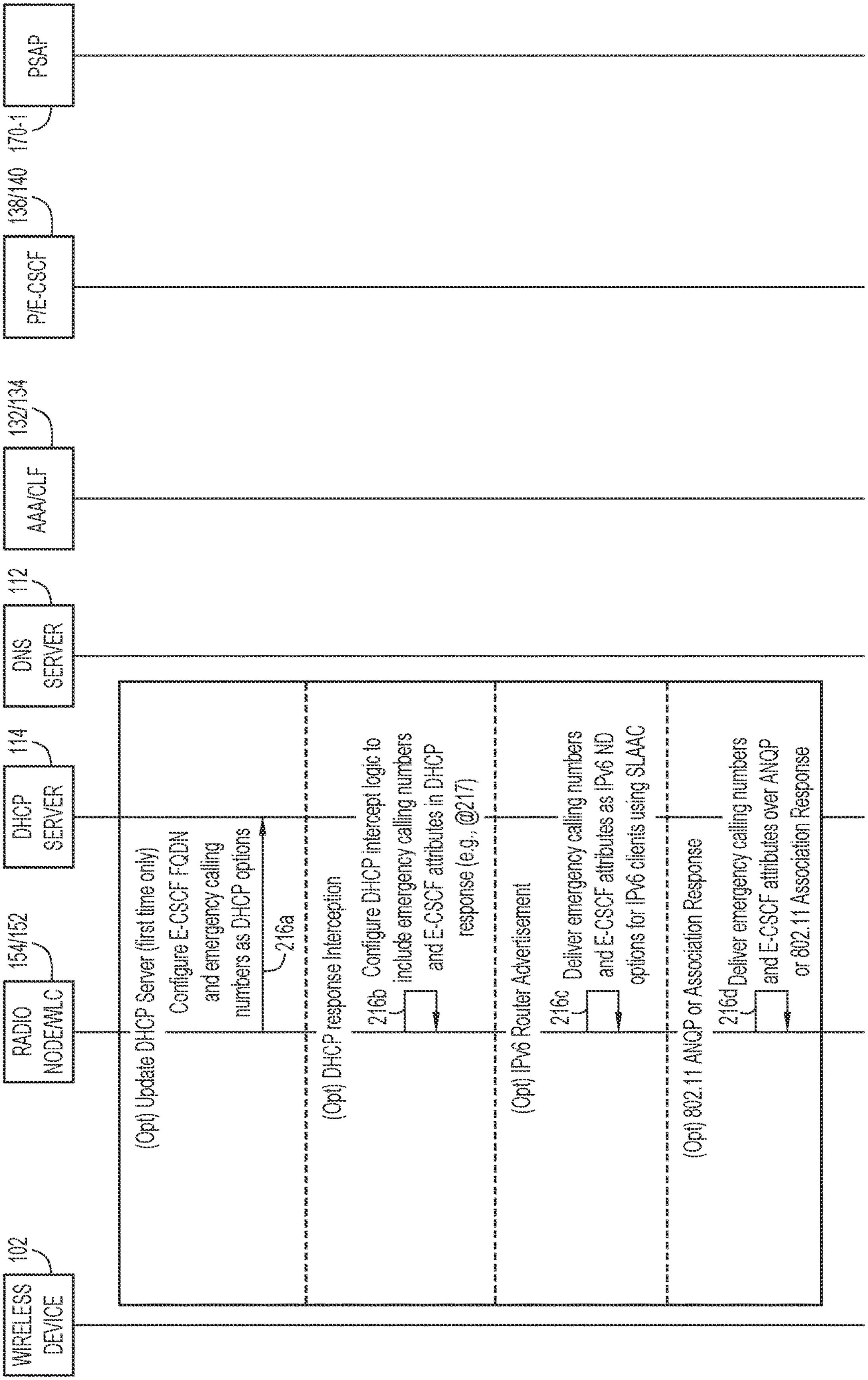
Figure 2D:
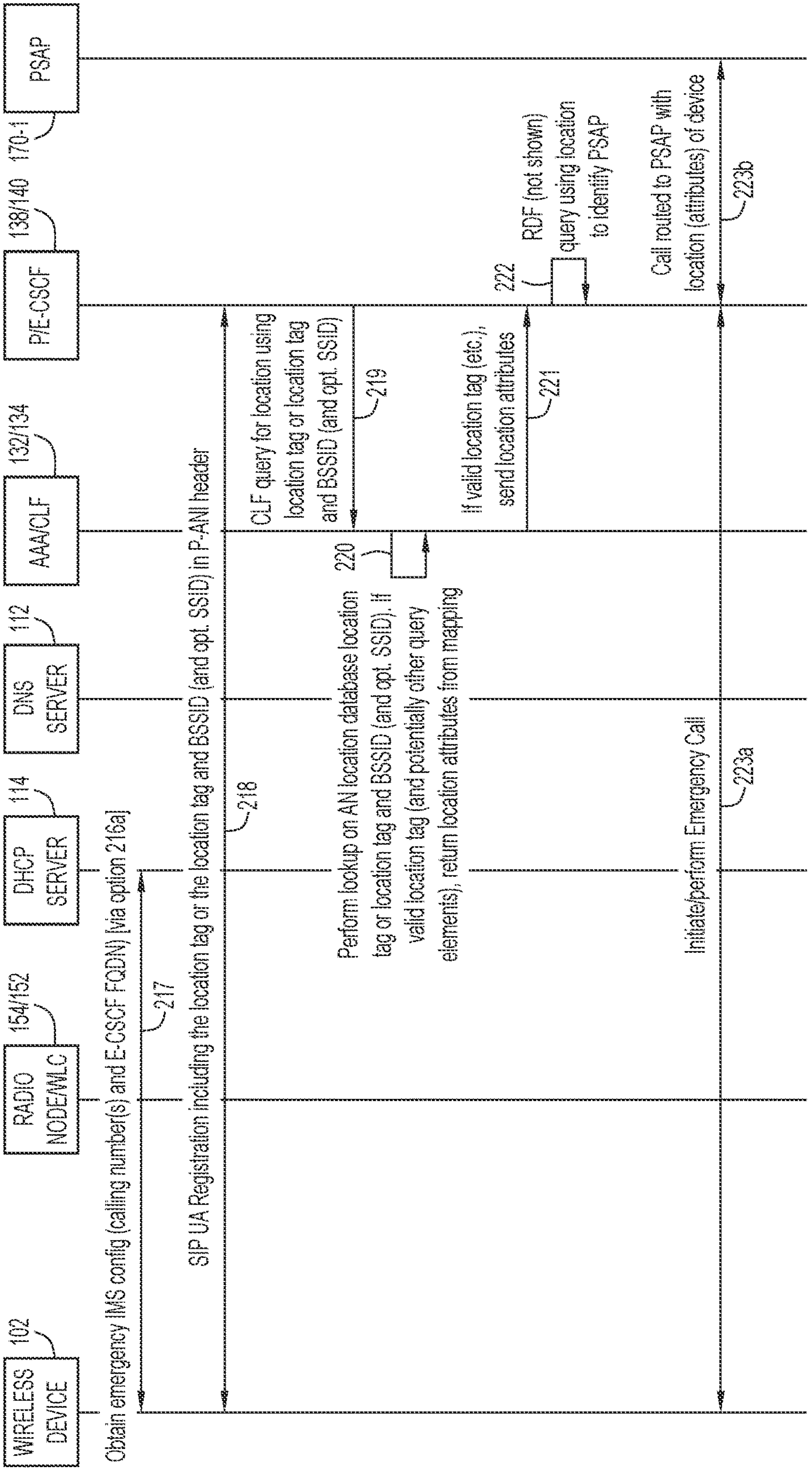

Continuing to FIG. 2C, the radio node 154 can deliver the emergency voice calling (IMS) configuration information to the wireless device 102 over any corresponding interface using any appropriate technique. For example, in at least one embodiment, DHCP communications may be utilized to deliver the configuration information to the wireless device 102. For example, as shown at 216*a*, the radio node 154 can signal the DHCP server 114 to configure the DHCP server 114 with the emergency voice calling (IMS) configuration information such that the wireless device 102, through signaling with the DHCP server 114 for address assignment procedures for the wireless device 102, as shown at 217 of FIG. 2D, the emergency voice calling (IMS) configuration information can be sent to the wireless device 102.

Other mechanisms/protocols can be used to deliver the emergency voice calling (IMS) configuration information to the wireless device 102. For example, in another embodiment, as shown at 216*b*, DHCP intercept logic (not shown) can be configured for radio node 154 such that, upon obtaining a DHCP response from the DHCP server 114 (for the address assignment procedures), the emergency voice calling (IMS) configuration information can be augmented into the response (e.g., via DHCP options) and sent to the wireless device 102.

In another embodiment, as shown at 216*c*, if the wireless device 102 is an IPV6 capable client/device, the emergency voice calling (IMS) configuration information can be delivered to the wireless device using IPv6 ND options using Stateless Address Auto-Configuration (SLAAC) procedures. In still another embodiment, as shown at 216*d*, the emergency voice calling (IMS) configuration information can be delivered to the wireless device 102 via an ANQP exchange (e.g., in an ANQP response sent to the device) or within an 802.11 Association Response. In still another embodiment, although not shown in FIG. 2C, at least some or all of the emergency voice calling (IMS) configuration information may be sent to the wireless device via the EAP-SUCCESS message sent at 214*b*.

Continuing with the present example in which the emergency voice calling (IMS) configuration information are delivered to the wireless device 102 by the DHCP server 114, as shown at 217, consider that wireless device 102, using the emergency voice calling (IMS) configuration information, performs, via the SIP UA 108, a SIP registration with the E-CSCF 140, via the P-CSCF 138, as shown at 218. A SIP registration typically involves a SIP request sent from a SIP UA to a SIP user agent server (UAS) (e.g., E-CSCF 140) and a SIP response being sent from the UAS to the UA in which the response accepts, rejects, or redirects the request. The UAS role lasts for the duration of a given SIP transaction. In other words, if a function/logic responds to a request, it acts as a UAS for a duration of that transaction. If the function/logic later generates a request for another transaction, it assumes the role of a user agent client for the processing of that new transaction.

For the SIP registration, the SIP UA 108, can insert a P-ANI header into the SIP registration message. The P-ANI header is a 3GPP-specific header, as defined in 3GPP TS 34.229 for IP multimedia call control based on SIP and Session Description Protocol (SDP), in with the P-ANI header can be used to indicate to the IMS network (P/E-CSCF 138/140) over which access technology the wireless device 102 is attached to the IMS network, along with other related parameters.

IETF RFC 3455 defines conventional fields for a P-ANI header such as an "access-type" field that can be set to "IEEE-802.11" by the SIP UA 108 (access-type=IEEE-802.11) to indicate that the wireless device is attached to WLAN 150. IETF RFC 7315 defines mechanisms through which private header extensions can be used for 3GPP to carry additional information, such as an identifier of radio node 154 (e.g., BSSID and potentially SSID.

For embodiments herein, a newly defined parameter or field may be provided for the P-ANI header, such as "secure-location-tag" or the like that can be used to carry the location tag (SLT) obtained by the wireless device, such as [secure-location-tag="location-tag<string>"], in which the <string> may be set to the value for the location tag generated by radio node 154 and delivered to the wireless device 102, as discussed for 211 of FIG. 2A.

For embodiments in which BSSID and optionally SSID may be included in the P-ANI header, the field "wlan-node-id" can be set to the BSSID (e.g., wlan-node-id=<BSSID>) or optionally the BSSID and the SSID (e.g., wlan-node-id=<BSSID+SSID>).

Following the SIP registration, assuming a SIP response is sent to wireless device 102 accepting the SIP request received from the wireless device 102, the E-CSCF 140, as shown at 219, can use the location tag from the P-ANI header and, in some instances additionally the BSSID (and SSID, if applicable) to query the CLF 134 in order to both determine the location of the wireless device 102 (based on the location tag to location mapping contained in the AN location DB 136) and also to verify the authenticity of the location tag reported by the wireless device in the P-ANI header.

For example, upon obtaining the query elements, such as the location tag (and optionally BSSID or BSSID and SSID), CLF 134 can perform a lookup on the AN location DB 136 using the received query elements, as shown at 220, and, assuming, the location tag received from the wireless device 102 via the P-ANI header is a valid/authentic location tag (as generated by the radio node 154) or, stated differently, upon, successful verification of the authenticity of the location tag, the lookup will return the location attributes that identify the location associated with wireless device 102 as stored in the mapping such that the CLF 134 can send the location attributes that identify the location associated with wireless device 102 to the E-CSCF 140, as shown at 221.

However, if the location tag is not valid such that the location tag received in the P-ANI header from the wireless device 102 and used to query the CLF 134/AN location DB 136 does not match the location tag as stored in the AN location DB 136 at 215, the lookup on the AN location DB 136 will fail and such an indication can be sent to the E-CSCF 140, which can reject a subsequent emergency call transmitted from the wireless device 102 to the E-CSCF 140.

Continuing with the present example, assuming the location tag is valid and its authenticity is verified via the query/lookup, the E-CSCF 140 (upon obtaining the location attributes that identify the location associated with wireless device 102) can, as generally illustrated at 222, perform a query on the RDF 142 (not shown in FIG. 2A) in order to identify the PSAP (and corresponding PSAP destination IP address) that is to provide emergency calling services for the location associated with the wireless device 102 (coverage of WLAN 150), such as the destination IP address for PSAP 170-1 for the present example.

Thereafter, which the wireless device initiates/performs the emergency call (using an obtained emergency calling number, as discussed for embodiments herein), as shown at 223*a*, the call is routed to the PSAP 170-1 by the E-CSCF 140 along with the location associated with the wireless device 102, as shown at 223*b*, and emergency services can be dispatched to the location of the wireless device 102.

Thus, in accordance with embodiments herein, a location tag (SLT), in combination with an identifier of the access point to which the wireless device is connected (e.g., BSSID, cell identifier, etc.), can be used to verify the authenticity of the user's location as identified via a SIP registration involving an E-CSCF.

Accordingly, embodiments described herein may herein leverage the legal framework and the building blocks of federation-based roaming architectures (e.g., OpenRoaming) for extending emergency services (e.g., 911) calling over P5G/Wi-Fi into tens of thousands of already deployed hotspots. The embodiments presented here can also be applied for supporting emergency calling over unlicensed P5G access networks.

Further, embodiments herein may be utilized in a variety of network environments. For example, one environment may encompass telecommunications service provider-owned Wi-Fi access points in which other communications technologies may be operating on unlicensed spectrum, available to the public for access to emergency calling services, without involving traditional user-specific login credentials, during times of emergency, when mobile (cellular) service is unavailable. Yet another environment may encompass non-telecommunications service provider-owned Wi-Fi access points of public access to emergency calling services when mobile service is unavailable. Still another environment may encompass other alternative means of providing the public with access to emergency calling services during times of emergency when mobile service is unavailable.

Although embodiments of FIGS. 1, 2A, and 2B are discussed with reference to WLANs, as noted above, embodiments herein may also be implemented for private 5G (P5G) networks. For example, with regard to P5G networks, embodiments herein may be extended to implementations in P5G networks for use cases involving 5G-capable devices with any of valid SIM credentials, expired SIM credentials, or no SIM credentials. Thus, in some instances, an identifier for the radio node to which a wireless device is connected for an emergency call can include a gNB ID, a new radio (NR) Cell Global Identifier or Identity (CGI), or the like for the cellular radio node with which the wireless device is connected. Further, network element(s) facilitating delivery of a location tag to a wireless device initiating an emergency call can include any combination of a gNB with which a wireless device is connected, may include any combination of an Access and Mobility Management Function (AMF) and/or a Session Management Function (SMF) involving communications over any combination of Non-Access Stratum (NAS), Radio Resource Control (RRC), DHCP, IPv6 ND interfaces, and/or the like. In still some embodiments, embodiments herein may be extended to use cases with no public 5G network coverage but basic internet connectivity.

Further, although the embodiments of FIGS. 1, 2A, and 2B are discussed with reference to use of a location tag that can be generated/sent to a wireless device and also to emergency services IDP network 130 in order to verify the authenticity of the reported location of a given wireless device, embodiments herein also envision another approach for validating/verifying the reported location of a wireless device using signed location data.

For example, in at least one embodiment, rather than providing a location tag to a wireless device by the radio node to which the device connects for an emergency call, a time-based approach can be utilized in which signed location data can be sent to the wireless device that is to bind the device to a given location and time. The signed location data can be referred to as ANP-Signed-User-Location, and can be generated by signing the location, along with a time stamp representing the time at which the device connects to the radio node, an ANP or WLAN identifier such as BSSID and/or SSID, other auxiliary elements, and/or any other metadata that may be useful to facilitate authenticity verifications for wireless devices seeking to initiate an emergency call.

Still further, although certain embodiments herein are discussed with reference to use of the location tag, and optionally a BSSID along with the location tag in order determine a wireless device's physical location, in some embodiments, a wireless device may include only a BSSID in a SIP (P-ANI) header (e.g., for wireless devices that may not be capable of performing location tag operations as discussed herein) through which the CLF can be queried to identify the physical location of the wireless device. In such BSSID-only embodiments, other security mechanisms may be provided in the system in order to prevent potential rogue attacks from devices that may be reporting false BSSIDs.

In at least one embodiment, a certificate used for the location signing can be issued under the WBA's private PKI. The signed location element along with the ANP/WLAN identifier or certificate identifier can be delivered to the wireless device via an ANQP exchange, via an 802.11 Association Response, via DHCP, via IPV6 ND, or the like. In at least one embodiment, the radio node/access network can sign the location data along with a timestamp and other auxiliary elements binding it to the session to the access network.

A wireless device that has obtained the ANP-Signed-User-Location can include the same the SIP Registration messages sent to the P/E-CSCF via a new attribute field, "ANP-Signed-Location" that can be defined for inclusion in the P-ANI header. The E-CSCF, upon receiving a SIP Registration (Request) message with the P-ANI header containing the new element, can perform signature validation checks to ensure the included location element is signed by the ANP/radio node/WLAN, and against any other replay attacks.

In addition to the time-based approach for identifying/verifying the location of a wireless device, embodiments herein may be extended to encompass other operational variations.

Accordingly, embodiments herein may provide several benefits, including but not limited to, providing resiliency for both mobile RAN and core failures (e.g., operator packet gateway and/or IMS voice gateway) and facilitating a mobile network operator (MNO) agnostic solution (e.g., having no dependence on a specific MNO) since the emergency services common user identity and credentials are decoupled from an MNO SIM identity. Further, multiple sources of UE/user location can be provided via embodiments herein, including from WBA-OpenRoaming trusted and validated access networks. Still further, embodiments herein support deployment flexibility for an entity deploying emergency services (e.g., the FCC, WBA, etc.) to either leverage existing MNO core assets (e.g., E-CSCF, CLF. PSAP interface, etc.) and operate those assets directly or delegate to a cloud mobile core provider.

Figure 3:
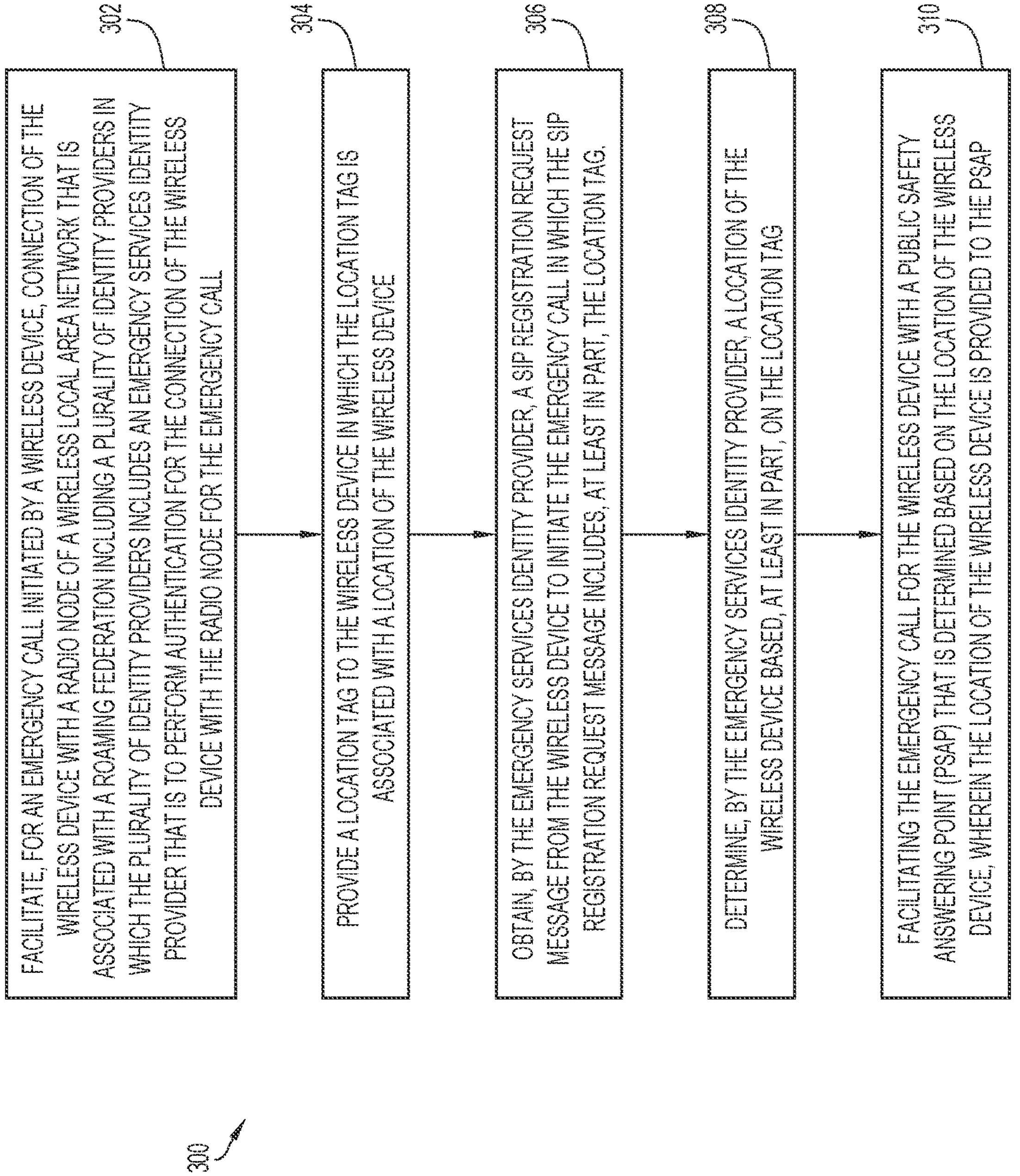
FIG. 3 is a flowchart depicting a method according to an example embodiment.

Referring to FIG. 3, FIG. 3 is a flowchart depicting a method 300 according to an example embodiment. In at least one embodiment, method 300 may be associated with operations that may be utilized to provide emergency telecommunication services via a WLAN according to an example embodiment. In various embodiments, method 300 may be performed by any combination of elements, functions, etc. discussed for embodiments herein, such as wireless device 102, radio node 154, DHCP server 114, DNS server 112, AAA server 132, CLF 134, E-CSCF 140, PSAP 170-1, etc.

As shown at 302, the method may include facilitating, for an emergency call initiated by a wireless device (e.g., wireless device 102), connection of the wireless device with a radio node of a wireless local area network (e.g., radio node 154 of WLAN 150) that is associated with a roaming federation including a plurality of identity providers in which the plurality of identity providers includes an emergency services identity provider that is to perform authentication for the connection of the wireless device with the radio node for the emergency call. For example, the wireless devices may initiate connection with the radio node of the wireless local area network based on an emergency services access network identifier being broadcast by the radio node indicating support for emergency calling services in which the emergency services access network identifier is identified in a wireless profile configured for the wireless device for use in performing the emergency call. In at least one embodiment, the emergency services access network identifier is a Roaming Consortium Organizational Identifier (RCOI) for an emergency services identity provider that is to facilitate the authentication for the emergency call.

At 304, the method may include providing a location tag to the wireless device in which the location tag is associated with a location of the wireless device. In various embodiments, the location tag can be generated by the radio node and, in some instances, may be based on a civic address and/or geo-spatial coordinates/location information of the radio node and/or of the wireless device. In various embodiments, the location tag can be provided to the wireless device via one of: a DHCP communication exchange involving the wireless device; an IPV6 Router Advertisement communicated to the wireless device; an ANQP communication exchange involving the wireless device; or an IEEE 802.11 (any 802.11 variant now known or hereinafter developed) Association Response message sent to the wireless device.

At 306, the method may include obtaining, by the emergency services identity provider, a SIP registration request message from the wireless device to initiate the emergency call in which the SIP registration request message includes, at least in part, the location tag. In at least one embodiment, the location tag can be included in a Private-Access-Network-Info (PANI) header of the SIP registration request message sent to an E-CSCF maintained by the emergency services identity provider.

At 308, the method may include determining, by the emergency services identity provider (e.g., by the E-CSCF of the emergency services identity provider), a location of the wireless device based, at least in part, on the location tag. For example, in at least one embodiment, through performing the authentication for the connection of the wireless device with the radio node for the emergency call with the emergency services identity provider (e.g., with an authentication server (e.g., AAA server 132) for the emergency services identity provider), the method may include providing location attributes that identify the location of the wireless device, the location tag, and optionally an identifier associated with the radio node to a location database maintained by the emergency services identity provider. The location attributes can include one or more of a civic address and/or geo-spatial coordinates of the radio node and/or the wireless device.

For example, the location attributes that identify the location of the wireless device, the location tag, and optionally the identifier associated with the radio node can be sent from the radio node/wireless local area network to an authentication server (e.g., AAA server 132) of the emergency services identity provider through an authentication (e.g., EAP) exchange involving the wireless device. From the authentication server, the location attributes that identify the location of the wireless device, the location tag, and optionally the identifier associated with the radio node can be sent to a CLF and stored via the location database that maintains a mapping of the location attributes mapped to or otherwise correlated/associated with the location tag and optionally the identifier associated with the radio node.

In at least one embodiment, determining the location of the wireless device can include sending a query from the E-CSCF to the CLF to perform a lookup on the location database by the CLF using the location tag (and potentially the radio node identifier) contained in the SIP registration request message to determine the location attributes in which the location of the wireless device is identified from the location attributes. The query/lookup on the location database may also provide for verifying the authenticity of the location tag obtained from the wireless devices, such that upon a successful verification of the authenticity of the location tag, the location attributes are obtained by the E-CSCF from the CLF.

At 310, the method may include facilitating the emergency call for the wireless device with a public safety answering point (PSAP) that is determined based on the location of the wireless device, wherein the location of the wireless device is provided to the PSAP. For example, the E-CSCF can determine the location of the wireless device based on the location attributes, can identify the PSAP that is to provide emergency telecommunication services for the location, and can route the emergency call for the wireless device, along with the location, to the PSAP.

Figure 4:
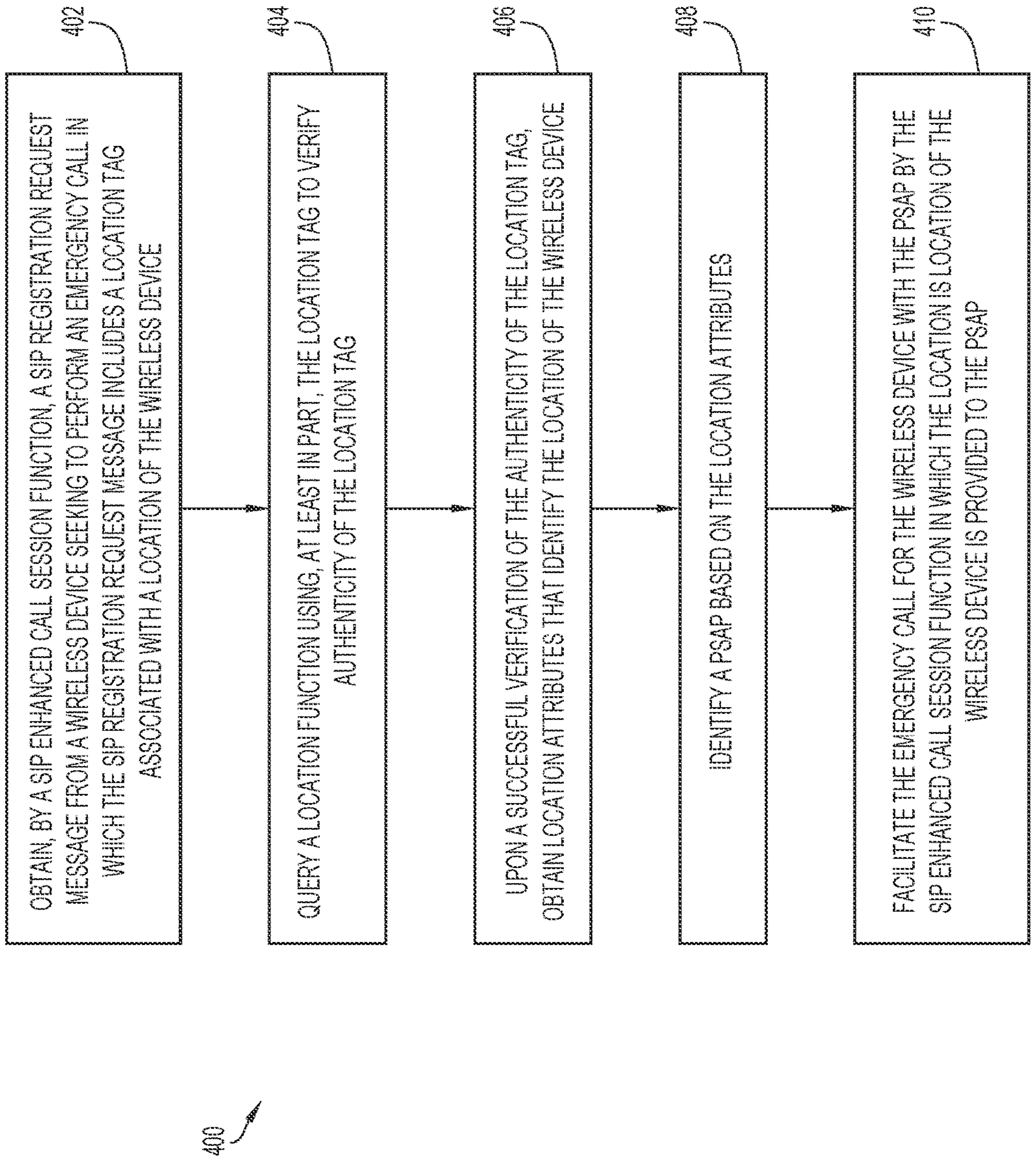
FIG. 4 is another flowchart depicting another method according to an example embodiment.

FIG. 4 is a flowchart depicting another method 400 according to an example embodiment. In at least one embodiment, method 400 may be associated with operations that may be utilized to provide emergency telecommunication services via a WLAN according to an example embodiment. In at least one embodiment, method 400 may be performed, at least in part, by a SIP enhanced call session function, such as E-CSCF 140.

At 402, the method may include obtaining, by a SIP enhanced call session function (e.g., E-CSCF 140, via P-CSCF 138), a SIP registration request message from a wireless device (e.g., wireless device 102) seeking to perform an emergency call in which the SIP registration request message includes a location tag associated with a location of the wireless device. The location tag may be obtained by the wireless device from a radio node with which the wireless device is connected for performing the emergency call.

At 404, the method may include querying a location function using, at least in part, the location tag to verify authenticity of the location tag. In at least one embodiment, determining the location of the wireless device can include sending a query from a E-CSCF to a CLF to perform a lookup on a location database by the CLF using the location tag (and potentially the radio node identifier) contained in the SIP registration request message to determine the location attributes in which the location of the wireless device is identified from the location attributes.

At 406, the method may include, upon a successful verification of the authenticity of the location tag, obtaining location attributes that identify the location of the wireless device. For example, the query/lookup on the location database provide for verifying the authenticity of the location tag obtained from the wireless devices, such that upon a successful verification of the authenticity of the location tag, the location attributes are obtained by the E-CSCF from the CLF.

At 408, the method may include identifying a PSAP based on the location attributes and, at 410, the method may include facilitating the emergency call for the wireless device with the PSAP by the SIP enhanced call session function in which the location is location of the wireless device is provided to the PSAP.

Figure 5:
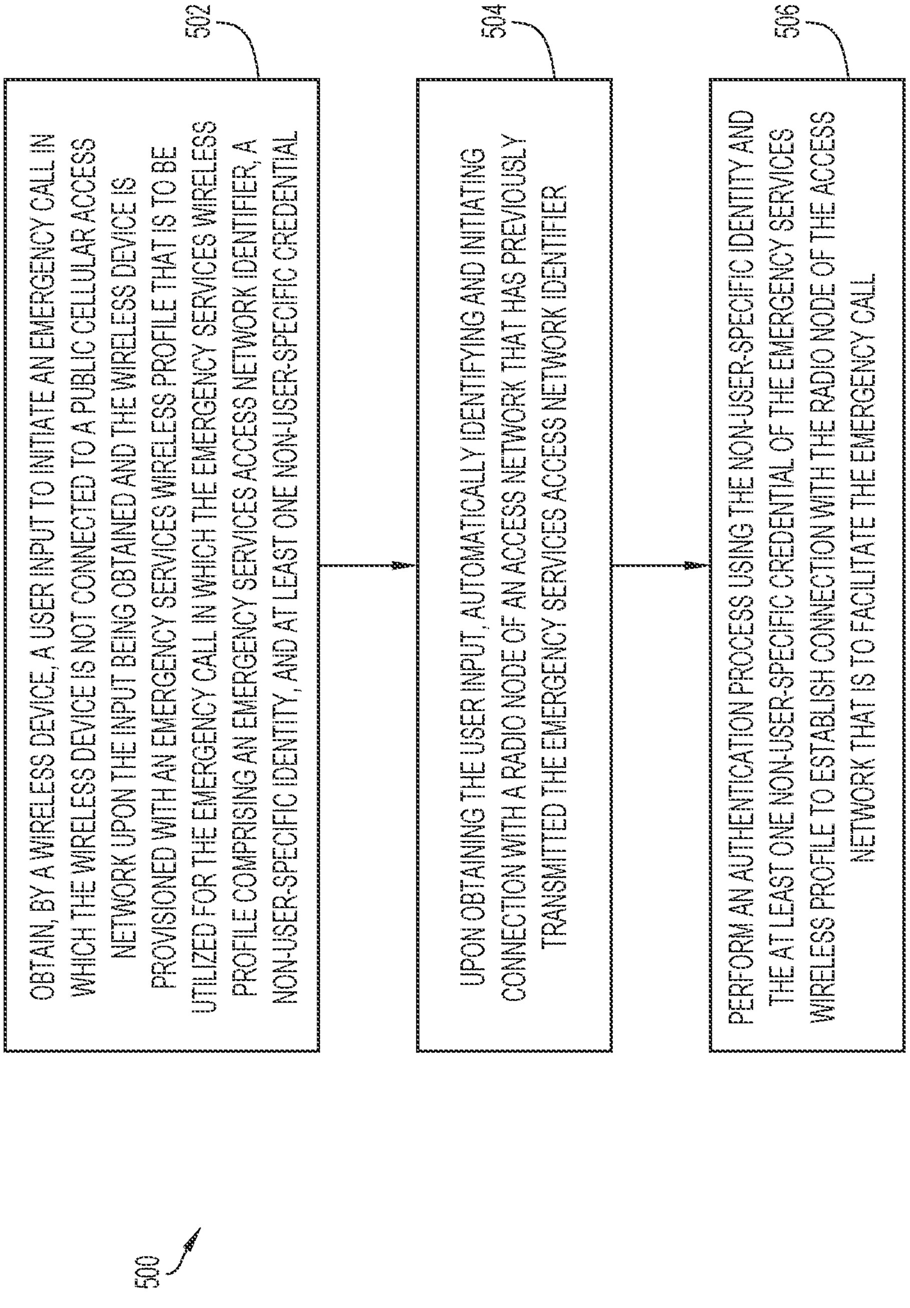
FIG. 5 is yet another flowchart depicting yet another method according to an example embodiment.

FIG. 5 is a flowchart depicting another method 500 according to an example embodiment. In at least one embodiment, method 500 may be associated with operations that may be utilized to facilitate application driven profile prioritization for a wireless device according to an example embodiment. In at least one embodiment, method 500 may be performed by a wireless device, such as wireless device 102.

At 502, the method may include obtaining, by a wireless device, a user input to initiate an emergency call in which the wireless device is not connected to a public cellular access network upon the input being obtained and the wireless device is provisioned with an emergency services wireless profile that is to be utilized for the emergency call in which the emergency services wireless profile comprising an emergency access network identifier, a non-user-specific identity, and at least one non-user-specific credential.

In at least one embodiment, the emergency services wireless profile may be a Passpoint profile provisioned for the wireless device. In various embodiments, the user input may be a user of the wireless device selecting/touching/triggering an OS/emergency calling application (e.g., OS/emergency calling application 106 of wireless device 102) to perform the emergency call and/or causing an emergency calling number to be provided for the wireless device to perform the emergency call.

At 504, the method may include upon obtaining the user input, automatically identifying and initiating connection with a radio node of an access network that has previously transmitted the emergency access network identifier. In at least one embodiment, the emergency services access network identifier is a Roaming Consortium Organizational Identifier (RCOI) for an emergency services identity provider (e.g., emergency services IDP network 130) that is to facilitate the authentication for the emergency call.

At 506, the method may include performing an authentication process using the non-user-specific identity and the at least one non-user-specific credential of the emergency services wireless profile to establish connection with the radio node of the access network that is to facilitate the emergency call. The authentication may be performed via the radio node and an authentication server (e.g., AAA server 132) provided by the emergency services identity provider.

Although not shown in FIG. 5, the method 500 may further include obtaining, by the wireless device from the radio node, a location tag associated with a location of the wireless device. Further, although not shown in FIG. 5, the method 500 may further include obtaining emergency calling configuration information via the radio node in which the emergency calling configuration information is to enable the wireless device to initiate/perform the emergency call. The emergency calling configuration information can includes a for an enhanced call session function that is to facilitate the emergency call and at least one emergency calling number that is to be utilized by the wireless device to initiate the emergency call.

The method 500 may further include sending a SIP registration request message to an enhanced call session function that includes the location tag to initiate the emergency call with the enhanced call session function. The location tag, and potentially one or more identifiers of the radio node, can be included in a P-ANI header of the SIP registration request message. Upon obtaining a SIP registration response message indicating that the request has been accepted, the method may further include performing the emergency call via the enhanced call session function and a PSAP identified based on the location of the wireless device in which the location of the wireless device is sent to the PSAP.

Figure 6:
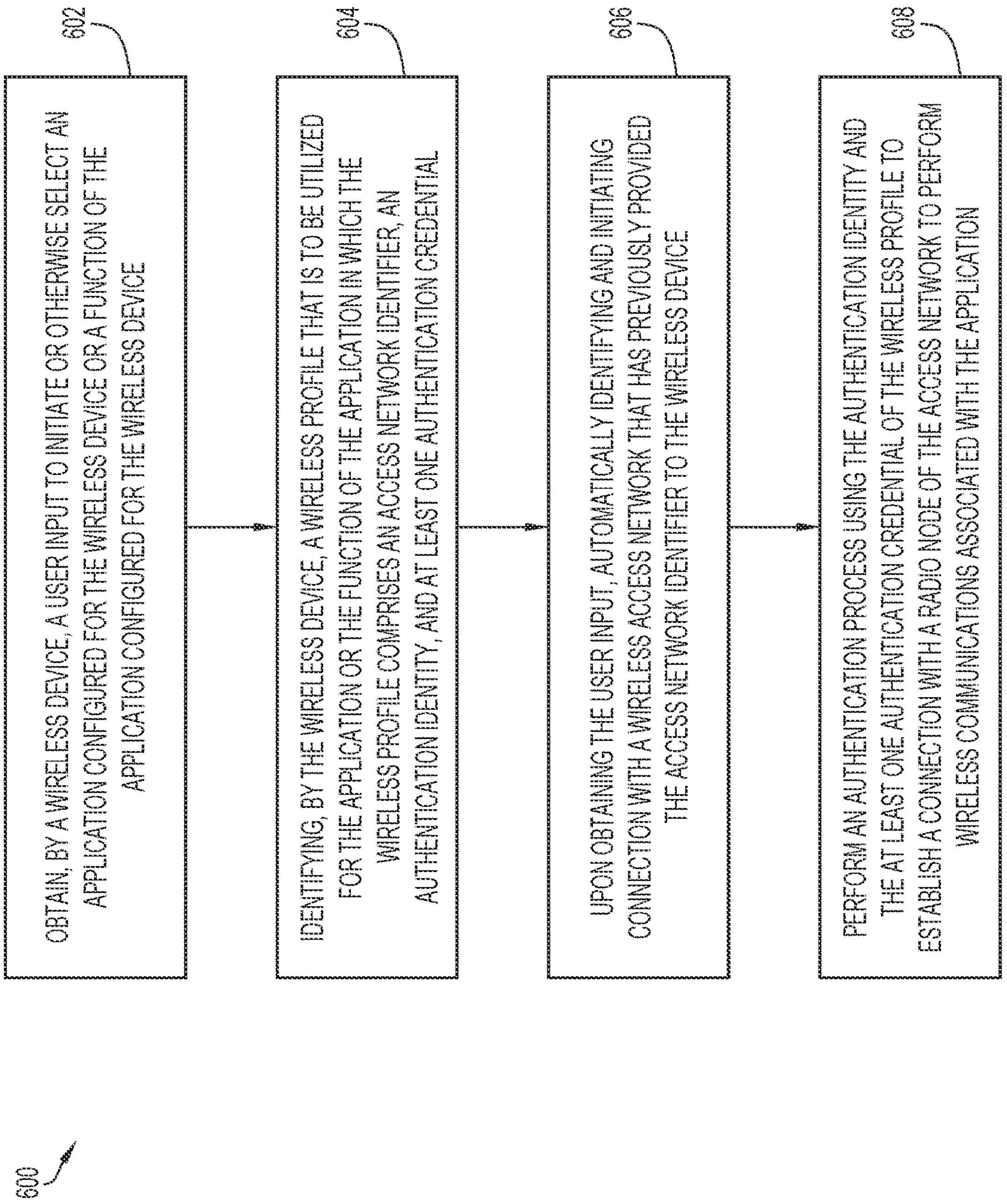
FIG. 6 is yet another flowchart depicting yet another method according to an example embodiment.

FIG. 6 is a flowchart depicting another method 600 according to an example embodiment. In at least one embodiment, method 600 may be associated with other operations that may be utilized to facilitate application driven profile prioritization for a wireless device according to an example embodiment. In at least one embodiment, method 600 may be performed by a wireless device, such as wireless device 102.

Although some embodiments herein have described application driven profile prioritization with reference to performing an emergency call by a wireless device, embodiments herein may also enable application driven profile prioritization for any number of applications and/or one or more functions of an application and wireless (Passpoint) profiles that may be provisioned for a wireless device.

For example, in at least one embodiment, application logic configured for a wireless device, such as wireless device 102, for a particular application (e.g., a streaming video application) may include logic that enables the particular application to prioritize multiple wireless profiles (e.g., Passpoint profiles) configured for the wireless device such that a particular wireless profile can be identified by the particular application, above all other profiles configured for the device, selected, and parsed in order to identify a particular access network identifier (e.g., RCOI, etc.), a particular user identity, and particular user credential(s) contained within the particular profile that are to be utilized by the wireless device to identify an access network to which to attach (e.g., that broadcasts or otherwise provides an access network identifier to the wireless device that matches the access network identifier included in the particular profile) and perform an authentication with a particular provider (e.g., IDP) using the identity/credential(s) included in the particular profile.

In another example, in at least one embodiment, application logic configured for a wireless device, such as wireless device 102, for a particular application (e.g., a voice calling application) may include logic that enables the particular application, to select/parse information for a particular application when a particular function of the application is initiated. For example, when the voice application is selected for a normal call, one profile may be selected to utilize for the call; however, when an emergency calling option/function within the application is selected, an emergency services wireless profile can be selected and parsed in order to facilitate emergency calling operations as discussed for embodiments herein.

Thus, wireless profile prioritization may be triggered based on any type and/or combination of application interactions, such as selecting/initiating an application or selecting/initiation a particular function of a particular application in accordance with various embodiments herein.

At 602, the method may include obtaining, by a wireless device, a user input to initiate or otherwise select at least one of an application configured for the wireless device or a function of the application configured for the wireless device. In various embodiments, the user input may be a user of the wireless device selecting/touching/triggering the application or a function within the application (e.g., a particular button, option, etc.) to execute operations involving the application (e.g., interacting with the application, downloading a video via the application, playing a game via the application, performing a video teleconference via the application, etc.). In various embodiments, the application may be any combination of an emergency voice calling/communication application, a non-emergency voice calling/communication application, a video streaming application, an audio streaming application, a gaming application, an enterprise application, and/or the like. In at least one embodiment, the application may be a non-emergency voice calling application and the application function may be an emergency voice calling application function within the non-emergency voice calling application.

At 604, the method may include identifying, by the wireless device, a wireless profile that is to be utilized for the application or the function of the application in which the wireless profile comprises an access network identifier, an authentication identity, and at least one authentication credential. In at least one embodiment, the wireless profile may include a name or other identifying characteristic through which logic of the application can automatically prioritize, identify, and select the wireless profile to be utilized in conjunction with the application.

In at least one embodiment, the access network identifier is a Roaming Consortium Organizational Identifier (RCOI) for an identity provider that is to facilitate the authentication process for the connection with the radio node of the access network. In at least one embodiment, the access network identifier is a Service Set Identifier (SSID). In at least one embodiment, the access network identifier is a Public Land Mobile Network Identifier (PLMN-ID).

At 606, the method may include, upon obtaining the user input, automatically identifying and initiating connection with a wireless access network that has previously provided the access network identifier to the wireless device. In at least one embodiment, the access network identifier can be broadcast, transmitted, or otherwise provided to the wireless device via any combination of 802.11 Association Responses, 802.11 beacons, Master Information Block (MIB) or System Information Block (SIB) transmissions (e.g., for cellular access networks), ANQP exchanges (e.g., query/response exchanges), and/or the like. In some embodiments, the operations at 606 may include disconnecting from a wireless access network of a same or different access type that has not provided the access network identifier to the wireless device and/or reconnecting with the wireless access network that has previously provided the access network identifier to the wireless device. In at least one embodiment, the wireless network is a WLAN (e.g., Wi-Fi access network). In at least one embodiment, the wireless network is a WWA access network (e.g., cellular/3GPP/CBRS access network).

In at least one embodiment, initiating connection with the radio node may include initiating an authentication exchange (e.g., an EAP/802.1x authentication exchange) with the radio node. In at least one embodiment, initiating connection with the radio node may include transmitting a 3GPP registration request toward the radio node.

At 608, the method may include performing an authentication process using the authentication identity and the at least one authentication credential of the wireless profile to establish a connection with a radio node of the access network to perform wireless communications associated with the application. In various embodiments, the authentication process can include a Subscriber Identity Module (SIM)-based authentication process (e.g., as prescribed by 3GPP standards), a non-SIM-based authentication process (e.g., a federation-based (OpenRoaming) authentication process, a non-federation-based authentication process (e.g., 802.11 EAP authentication), and/or any appropriate authentication process as may be prescribed by any applicable authentication standard/protocol (e.g., EAP (including any variation thereof), etc.).

Figure 7:
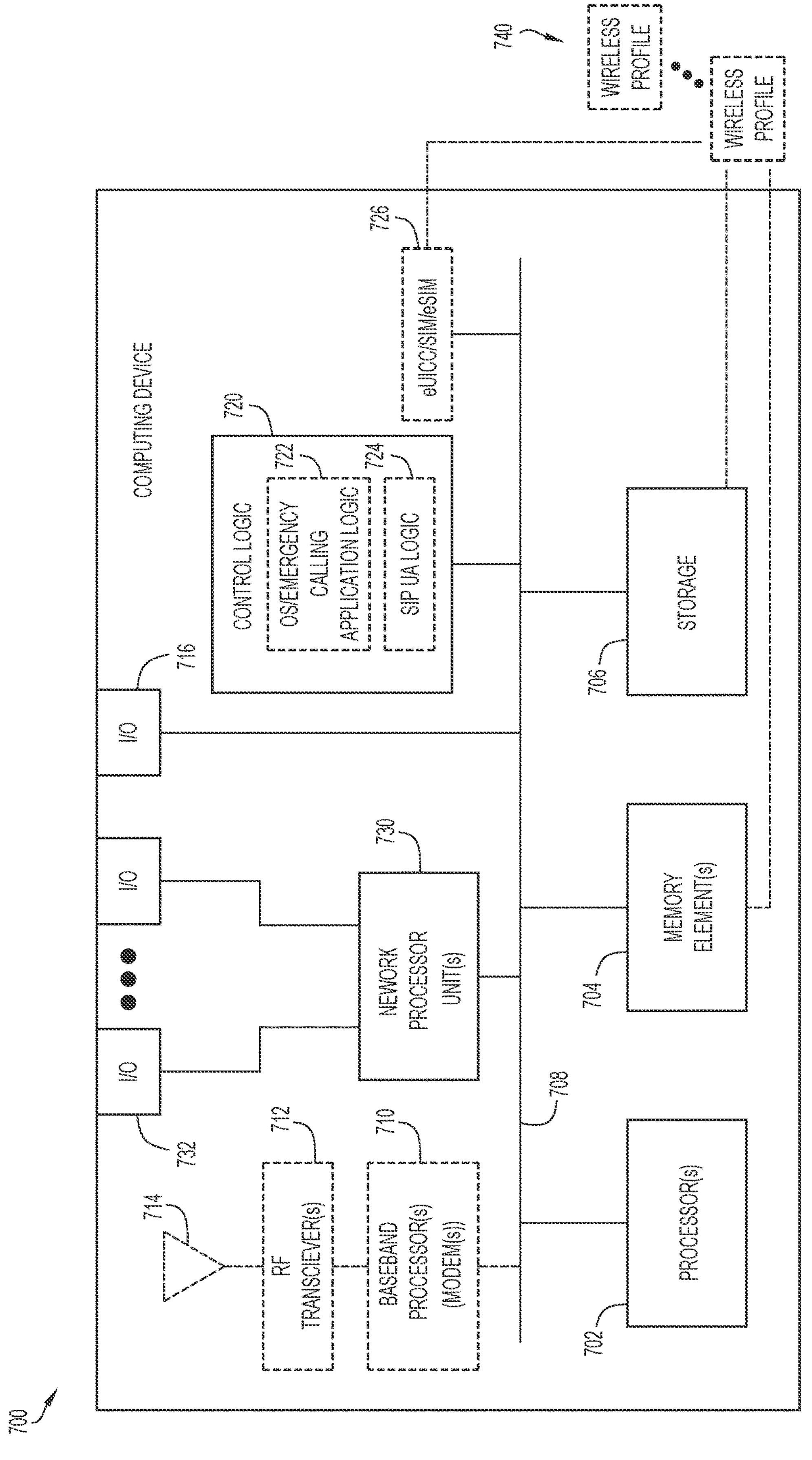
FIG. 7 is a hardware block diagram of a computing device that may perform functions associated with any combination of operations discussed in connection with techniques described for embodiments herein.

Referring to FIG. 7, FIG. 7 illustrates a hardware block diagram of a computing device 700 that may perform functions associated with operations discussed herein in connection with the techniques depicted via FIGS. 1, 2A, 2B, 3, 4, 5, and 6. In various embodiments, a computing device or apparatus, such as computing device 700 or any combination of computing devices 700, may be configured as any entity/entities as discussed for the techniques depicted in connection with operations illustrated/discussed for various embodiments herein, such as, wireless device 102, radio node 154, WLC 152, DNS server 112, DHCP server 114, AAA server 132, CLF 134 (potentially inclusive of AN location DB 136), P-CSCF 138, E-CSCF 140, RDF 142, PSAP 170-1, and/or any other elements/functions/nodes discussed herein.

In at least one embodiment, the computing device 700 may be any apparatus that may include one or more processor(s) 702, one or more memory element(s) 704, storage 706, a bus 708, one or more network processor unit(s) 730 interconnected with one or more network input/output (I/O) interface(s) 732, one or more I/O interface(s) 716, and control logic 720. For embodiments in which computing device 700 may be implemented as a wireless device or UE, such as wireless device 102, control logic 720 may include OS/emergency calling application logic 722 and SIP UA logic 724. In various embodiments, instructions associated with logic for computing device 700 can overlap in any manner and are not limited to the specific allocation of instructions and/or operations described herein.

For embodiments in which computing device 700 may be implemented as any device capable of wireless communications (e.g., wireless device 102, radio node 154, and radio node 164), computing device 700 may further include at least one baseband processor or modem 710, one or more radio RF transceiver(s) 712 (e.g., any combination of RF receiver(s) and RF transmitter(s)), one or more antenna(s) or antenna array(s) 714.

Additionally, for embodiments in which computing device 700 may be implemented as a wireless device/user equipment (UE) or the like, computing device 700 may include any combination of an Embedded Universal Integrated Circuit Card (eUICC), Subscriber Identity Module (SIM) (sometimes referred to as Subscriber Identification Module) card, and/or embedded SIM (eSIM) 726. As also illustrated in FIG. 7, one or more wireless profile(s) 740 can be configured for any combination of memory element(s) and/or storage 706, for non-SIM based (e.g., Passpoint) wireless profiles, and/or for the eUICC/SIM/eSIM 726, for SIM-based (e.g., public/private 3GPP/cellular) wireless profiles.

In at least one embodiment, processor(s) 702 is/are at least one hardware processor configured to execute various tasks, operations and/or functions for computing device 700 as described herein according to software and/or instructions configured for computing device 700. Processor(s) 702 (e.g., a hardware processor) can execute any type of instructions associated with data to achieve the operations detailed herein. In one example, processor(s) 702 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 704 and/or storage 706 is/are configured to store data, information, software, and/or instructions associated with computing device 700, and/or logic configured for memory element(s) 704 and/or storage 706. For example, any logic described herein (e.g., control logic 720, OS/emergency calling application logic 722, OS/emergency calling application 106, SIP UA logic 724, and SIP UA 108) can, in various embodiments, be stored for computing device 700 using any combination of memory element(s) 704 and/or storage 706. Note that in some embodiments, storage 706 can be consolidated with memory element(s) 704 (or vice versa) or can overlap/exist in any other suitable manner.

In at least one embodiment, bus 708 can be configured as an interface that enables one or more elements of computing device 700 to communicate in order to exchange information and/or data. Bus 708 can be implemented with any architecture designed for passing control, data and/or information between processors, memory elements/storage, peripheral devices, and/or any other hardware and/or software components that may be configured for computing device 700. In at least one embodiment, bus 708 may be implemented as a fast kernel-hosted interconnect, potentially using shared memory between processes (e.g., logic), which can enable efficient communication paths between the processes.

In various embodiments, network processor unit(s) 730 may enable communication between computing device 700 and other systems, entities, etc., via network I/O interface(s) 732 (wired and/or wireless) to facilitate operations discussed for various embodiments described herein. In various embodiments, network processor unit(s) 730 can be configured as a combination of hardware and/or software, such as one or more Ethernet driver(s) and/or controller(s) or interface cards, Fibre Channel (e.g., optical) driver(s) and/or controller(s), wireless receivers/transmitters/transceivers, baseband processor(s)/modem(s), and/or other similar network interface driver(s) and/or controller(s) now known or hereafter developed to enable communications between computing device 700 and other systems, entities, etc. to facilitate operations for various embodiments described herein. In various embodiments, network I/O interface(s) 732 can be configured as one or more Ethernet port(s), Fibre Channel ports, any other I/O port(s), and/or antenna(s)/antenna array(s) now known or hereafter developed. Thus, the network processor unit(s) 730 and/or network I/O interface(s) 732 may include suitable interfaces for receiving, transmitting, and/or otherwise communicating data and/or information (wired and/or wirelessly) in a network environment.

I/O interface(s) 716 may allow for input and output of data and/or information with other entities that may be connected to computing device 700. For example, I/O interface(s) 716 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

For embodiments in which computing device 700 is implemented as a wireless device or any apparatus capable of wireless communications, the RF transceiver(s) 712 may perform RF transmission and RF reception of wireless signals via antenna(s)/antenna array(s) 714, and the baseband processor or modem 710 performs baseband modulation and demodulation, etc. associated with such signals to enable wireless communications for computing device 700.

In various embodiments, control logic 720 and, if provided, OS/calling application logic 722 and SIP UA logic 724, can include instructions that, when executed, cause processor(s) 702 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 720, etc.) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, any entity or apparatus as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 704 and/or storage 706 can store data, software, code, instructions (e.g., processor instructions), logic, parameters, combinations thereof, and/or the like used for operations described herein. This includes memory element(s) 704 and/or storage 706 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

In one form, a computer-implemented method may be provided in which the method includes facilitating, for an emergency call initiated by a wireless device, connection of the wireless device with a radio node of a wireless local area network that is associated with a roaming federation comprising a plurality of identity providers, the plurality of identity providers comprising an emergency services identity provider that is to perform authentication for the connection of the wireless device with the radio node for the emergency call; providing a location tag to the wireless device, wherein the location tag is associated with a location of the wireless device; obtaining, by the emergency services identity provider, a session initiation protocol (SIP) registration request message from the wireless device to initiate the emergency call, wherein the SIP registration request message comprises the location tag; determining, by the emergency services identity provider, a location of the wireless device based, at least in part, on the location tag; and facilitating the emergency call for the wireless device with a public safety answering point (PSAP) that is determined based on the location of the wireless device, wherein the location of the wireless device is provided to the PSAP.

In one instance, the wireless devices initiates connection with the radio node of the wireless local area network based on an emergency services access network identifier being broadcast by the radio node indicating support for emergency calling services and the emergency services access network identifier is identified in a wireless profile configured for the wireless device for use in performing the emergency call.

In one instance, the emergency services access network identifier is a Roaming Consortium Organizational Identifier (RCOI) for an emergency services identity provider that is to facilitate the authentication for the emergency call.

In one instance, the SIP registration request message further comprises an identifier associated with the radio node and the location of the wireless device is determined based on the location tag and the identifier of the radio node. In one instance, the identifier associated with the radio node is at least one of a Basic Service Set Identifier (BSSID) or a Service Set Identifier (SSID). In one instance, the location tag is included in a Private-Access-Network-Info (PANI) header of the SIP registration request message.

In one instance, through performing the authentication for the connection of the wireless device with the radio node for the emergency call with the emergency services identity provider, providing location attributes that identify the location of the wireless device, the location tag, and optionally an identifier associated with the radio node to a location database maintained by the emergency services identity provider.

In one instance, determining the location of the wireless device includes performing a lookup on the location database using the location tag contained in the SIP registration request message to determine the location attributes, wherein the location of the wireless device is identified from the location attributes. In one instance, the location attributes include one or more of a civic address or geo-spatial coordinates of the radio node or the wireless device.

In various instances, the location tag is provided to the wireless device via one of: a Dynamic Host Configuration Protocol (DHCP) communication exchange involving the wireless device; an Internet Protocol version 6 (IPv6) Router Advertisement communicated to the wireless device; an Access Network Query Protocol (ANQP) communication exchange involving the wireless device; or an Institute of Electrical and Electronics Engineers (IEEE) 802.11 Association Response message sent to the wireless device.

In one instance, the method may include, through performing the authentication for the connection of the wireless device with the radio node for the emergency call with the emergency services identity provider, providing emergency calling configuration information to at least one of a controller or the radio node of the wireless local area network that identifies an enhanced call session function managed by the emergency services identity provider.

In one instance, the method may further include providing the emergency calling configuration information to the wireless device to enable to wireless device to initiate the emergency call. In one instance, the emergency calling configuration information includes a Fully Qualified Domain Name (FQDN) for the enhanced call session function and at least one emergency calling number that are to be utilized by the wireless device to initiate the emergency call.

In various instances, the emergency calling configuration information is provided to the wireless device via one of: a Dynamic Host Configuration Protocol (DHCP) communication exchange involving the wireless device; an Internet Protocol version 6 (IPv6) Router Advertisement communicated to the wireless device; an Access Network Query Protocol (ANQP) communication exchange involving the wireless device; or an Institute of Electrical and Electronics Engineers (IEEE) 802.11 Association Response message sent to the wireless device.

In one form, one or more non-transitory computer readable storage media encoded with instructions may be provided that, when executed by a processor, cause the processor to perform operations, comprising: facilitating, for an emergency call initiated by a wireless device, connection of the wireless device with a radio node of a wireless local area network that is associated with a roaming federation comprising a plurality of identity providers, the plurality of identity providers comprising an emergency services identity provider that is to perform authentication for the connection of the wireless device with the radio node for the emergency call; providing a location tag to the wireless device, wherein the location tag is associated with a location of the wireless device; obtaining, by the emergency services identity provider, a session initiation protocol (SIP) registration request message from the wireless device to initiate the emergency call, wherein the SIP registration request message comprises the location tag; determining, by the emergency services identity provider, a location of the wireless device based, at least in part, on the location tag; and facilitating the emergency call for the wireless device with a public safety answering point (PSAP) that is determined based on the location of the wireless device, wherein the location of the wireless device is provided to the PSAP.

In one form, an apparatus or a system may be provided that includes at least one memory element for storing data; and at least one processor for executing instructions associated with the data, wherein executing the instructions causes the apparatus or the system to perform operations, comprising: facilitating, for an emergency call initiated by a wireless device, connection of the wireless device with a radio node of a wireless local area network that is associated with a roaming federation comprising a plurality of identity providers, the plurality of identity providers comprising an emergency services identity provider that is to perform authentication for the connection of the wireless device with the radio node for the emergency call; providing a location tag to the wireless device, wherein the location tag is associated with a location of the wireless device; obtaining, by the emergency services identity provider, a session initiation protocol (SIP) registration request message from the wireless device to initiate the emergency call, wherein the SIP registration request message comprises the location tag; determining, by the emergency services identity provider, a location of the wireless device based, at least in part, on the location tag; and facilitating the emergency call for the wireless device with a public safety answering point (PSAP) that is determined based on the location of the wireless device, wherein the location of the wireless device is provided to the PSAP.

In one form, a computer-implemented method may be provided that may include obtaining, by a session initiation protocol (SIP) enhanced call session function, a SIP registration request message from a wireless device seeking to perform an emergency call, wherein the SIP registration request message comprises a location tag associated with a location of the wireless device; querying a location function using, at least in part, the location tag to verify authenticity of the location tag; upon a successful verification of the authenticity of the location tag, obtaining location attributes that identify the location of the wireless device; identifying a public safety answering point (PSAP) based on the location attributes; and facilitating the emergency call for the wireless device with the PSAP by the SIP enhanced call session function.

In one instance, the method may include, prior to obtaining the SIP registration request message from the wireless device, providing the location tag to the wireless device via a radio node with which the wireless device is connected. In one instance, the SIP registration request message further comprises an identifier associated with the radio node with which the wireless device is connected. In one instance, the identifier associated with the radio node to which the wireless device is connected is at least one of a Basic Service Set Identifier (BSSID) or a Service Set Identifier (SSID). In one instance, the querying includes the identifier associated with the radio node.

In one form, one or more non-transitory computer readable storage media encoded with instructions may be provided that, when executed by a processor, cause the processor to perform operations, comprising: obtaining, by a session initiation protocol (SIP) enhanced call session function, a SIP registration request message from a wireless device seeking to perform an emergency call, wherein the SIP registration request message comprises a location tag associated with a location of the wireless device; querying a location function using, at least in part, the location tag to verify authenticity of the location tag; upon a successful verification of the authenticity of the location tag, obtaining location attributes that identify the location of the wireless device; identifying a public safety answering point (PSAP) based on the location attributes; and facilitating the emergency call for the wireless device with the PSAP by the SIP enhanced call session function.

In one form, an apparatus or a system may be provided that includes at least one memory element for storing data; and at least one processor for executing instructions associated with the data, wherein executing the instructions causes the apparatus or system to perform operations, comprising: obtaining, by a session initiation protocol (SIP) enhanced call session function, a SIP registration request message from a wireless device seeking to perform an emergency call, wherein the SIP registration request message comprises a location tag associated with a location of the wireless device; querying a location function using, at least in part, the location tag to verify authenticity of the location tag; upon a successful verification of the authenticity of the location tag, obtaining location attributes that identify the location of the wireless device; identifying a public safety answering point (PSAP) based on the location attributes; and facilitating the emergency call for the wireless device with the PSAP by the SIP enhanced call session function.

In one form, a computer-implemented method may be provided that may include obtaining, by a wireless device, a user input to initiate an emergency call, wherein the wireless device is not connected to a public cellular access network upon obtaining the user input and the wireless device is provisioned with an emergency services wireless profile that is to be utilized for the emergency call, the emergency services wireless profile comprising an emergency services access network identifier, a non-user-specific identity, and at least one non-user-specific credential; upon obtaining the user input, automatically identifying and initiating connection with a radio node of an access network that has previously transmitted the emergency services access network identifier; and performing an authentication using the non-user-specific identity and the at least one non-user-specific credential of the emergency services wireless profile to establish connection with the radio node of the access network that is to facilitate the emergency call.

In one instance, the emergency services access network identifier is a Roaming Consortium Organizational Identifier (RCOI) for an emergency services identity provider that is to facilitate the authentication for the emergency call. In one instance, the method may include obtaining, by the wireless device from the radio node, a location tag associated with a location of the wireless device. In one instance, the method may include sending a Session Initiation Protocol (SIP) registration request message to an enhanced call session function that includes the location tag to initiate the emergency call with the enhanced call session function.

In one form, one or more non-transitory computer readable storage media encoded with instructions may be provided that, when executed by a processor, cause the processor to perform operations, comprising: obtaining, by a wireless device, a user input to initiate an emergency call, wherein the wireless device is not connected to a public cellular access network upon obtaining the user input and the wireless device is provisioned with an emergency services wireless profile that is to be utilized for the emergency call, the emergency services wireless profile comprising an emergency services access network identifier, a non-user-specific identity, and at least one non-user-specific credential; upon obtaining the user input, automatically identifying and initiating connection with a radio node of an access network that has previously transmitted the emergency services access network identifier; and performing an authentication using the non-user-specific identity and the at least one non-user-specific credential of the emergency services wireless profile to establish connection with the radio node of the access network that is to facilitate the emergency call.

In one form, a wireless device may be provided that includes at least one memory element for storing data; and at least one processor for executing instructions associated with the data, wherein executing the instructions causes the wireless device to perform operations, comprising: obtaining, by the wireless device, a user input to initiate an emergency call, wherein the wireless device is not connected to a public cellular access network upon obtaining the user input and the wireless device is provisioned with an emergency services wireless profile that is to be utilized for the emergency call, the emergency services wireless profile comprising an emergency services access network identifier, a non-user-specific identity, and at least one non-user-specific credential; upon obtaining the user input, automatically identifying and initiating connection with a radio node of an access network that has previously transmitted the emergency services access network identifier; and performing an authentication using the non-user-specific identity and the at least one non-user-specific credential of the emergency services wireless profile to establish connection with the radio node of the access network that is to facilitate the emergency call.

In one form, a computer-implemented method may be provided that may include obtaining, by a wireless device, a user input to initiate an application configured for the wireless device or a function of the application configured for the wireless device; identifying, by the wireless device, a wireless profile that is to be utilized for the application or the function of the application, wherein the wireless profile comprises an access network identifier, an authentication identity, and at least one authentication credential; upon obtaining the user input, automatically identifying and initiating connection with a wireless access network that has previously provided the access network identifier to the wireless device; and performing an authentication process using the authentication identity and the at least one authentication credential of the wireless profile to establish a connection with a radio node of the wireless access network to perform wireless communications associated with the application.

In one instance, the access network identifier is a Roaming Consortium Organizational Identifier (RCOI) for an identity provider that is to facilitate the authentication process for the connection with the radio node of the wireless access network. In one instance, the access network identifier is a Service Set Identifier (SSID). In one instance, the access network identifier is a Public Land Mobile Network (PLMN) identifier. In one instance, the authentication identity is not specific to a user of the wireless device and the at least one authentication credential are not specific to the user of the wireless device. In various instances, the application is an emergency calling application or the application is a voice calling application and the function of the application is an emergency calling application function. In one instance, at least one of the authentication identity is specific to a user of the wireless device or the at least one authentication credential are specific to the user of the wireless device. In various instances, the application is one or more of a non-emergency voice calling or communication application, a video streaming application, an audio streaming application, a gaming application, or an enterprise application.

In one form, one or more non-transitory computer readable storage media encoded with instructions may be provided that, when executed by a processor, cause the processor to perform operations, comprising: obtaining, by a wireless device, a user input to initiate an application configured for the wireless device or a function of the application configured for the wireless device; identifying, by the wireless device, a wireless profile that is to be utilized for the application or the function of the application, wherein the wireless profile comprises an access network identifier, an authentication identity, and at least one authentication credential; upon obtaining the user input, automatically identifying and initiating connection with a wireless access network that has previously provided the access network identifier to the wireless device; and performing an authentication process using the authentication identity and the at least one authentication credential of the wireless profile to establish a connection with a radio node of the wireless access network to perform wireless communications associated with the application.

In one form, a wireless device may be provided that includes at least one memory element for storing data; and at least one processor for executing instructions associated with the data, wherein executing the instructions causes the wireless device to perform operations, comprising: obtaining, by the wireless device, a user input to initiate an application configured for the wireless device or a function of the application configured for the wireless device; identifying, by the wireless device, a wireless profile that is to be utilized for the application or the function of the application, wherein the wireless profile comprises an access network identifier, an authentication identity, and at least one authentication credential; upon obtaining the user input, automatically identifying and initiating connection with a wireless access network that has previously provided the access network identifier to the wireless device; and performing an authentication process using the authentication identity and the at least one authentication credential of the wireless profile to establish a connection with a radio node of the wireless access network to perform wireless communications associated with the application.

Variations and Implementations

A wireless device, such as wireless device 102, and any other wireless devices discussed herein, may be considered any electronic device, user equipment (UE), etc. that initiates a connection or communication session with a corresponding core network, and may be inclusive of but not limited to a computer, a mobile phone or mobile communication device, an electronic tablet, a laptop, etc. an electronic device such as an industrial device (e.g., a robot), automation device, enterprise device, appliance, Internet of Things (IoT) device (e.g., sensor, monitor, meter (parking meter, gas meter, water meter, etc.), traffic light, camera/surveillance device, smart device, etc.), a wireless wide area (WWA) access (e.g., cellular/3GPP public/private 4G/5G/nG access) and wireless local area (WLA) access (e.g., 802.11/Wi-Fi) enabled device, a router with a WWA/WLA interface, and/or any other device, component, element, or object capable of initiating voice, audio, video, media, or data exchanges within a system. Thus, a wireless device may include any hardware and/or software to perform baseband signal processing (such as modulation/demodulation) as well as hardware (e.g., baseband processors (modems), transmitters and receivers, transceivers, and/or the like), software, logic and/or the like to facilitate signal transmissions and signal receptions via antenna assemblies (not shown) in order to connect to one or more radio nodes of a radio access network (RAN) (e.g., WLAN 150 and WLAN 160), for one or more sessions (e.g., an emergency calling session). Wireless device 102 may be configured with other logic in accordance with embodiments herein, such as OS/emergency calling application 106 and SIP UA 108, and/or any other logic to facilitate operations discussed for embodiments herein.

Radio nodes discussed for embodiments herein, such as radio node 154 and radio node 164, may implement a WLA (e.g., 802.11/Wi-Fi) air interface and, in some embodiments, a WWA (e.g., 3GPP/cellular) air interface, for any combination of Radio Access Technology (RAT) types (also known as 'accesses', 'wireless accesses', and variations thereof) for an access network/RAN, (e.g., WLAN 150 and WLAN 160), such as any combination of 3GPP unlicensed spectrum accesses (e.g., Licensed-Assisted Access (LAA), enhanced LAA (eLAA), further enhanced LAA (feLAA), and New Radio Unlicensed (NR-U)); 3GPP WWA licensed spectrum accesses (e.g., 4G/LTE, 5G/New Radio (NR) accesses); non-3GPP licensed/unlicensed spectrum wireless local area (WLA) accesses such as Institute of Electrical and Electronics Engineers (IEEE) 802.11 (e.g., Wi-Fi®), including any appropriate 802.11 standard/Wi-Fi designation (e.g., 802.11, 802.11b, 802.11a, 802.11g, 802.11n, 802.11ac/Wi-Fi 5, 802.11ax/Wi-Fi 6/6e, 802.11be/Wi-Fi 7, etc.); IEEE 802.16 (e.g., WiMAX®), Near Field Communications (NFC), ultra-wide band (UWB), Bluetooth®, and/or the like; Citizens Broadband Radio Service (CBRS) accesses; and/or the like.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IOT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein.

Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

In various example implementations, any entity or apparatus for various embodiments described herein can encompass network elements (which can include virtualized network elements, functions, etc.) such as, for example, network appliances, forwarders, routers, servers, switches, gateways, bridges, loadbalancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and, in the claims, can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X. Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Each example embodiment disclosed herein has been included to present one or more different features. However, all disclosed example embodiments are designed to work together as part of a single larger system or method. This disclosure explicitly envisions compound embodiments that combine multiple previously discussed features in different example embodiments into a single system or method.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:

facilitating, for an emergency call initiated by a wireless device, connection of the wireless device with a radio node of a wireless local area network that is associated with a roaming federation comprising a plurality of identity providers, the plurality of identity providers comprising an emergency services identity provider;

providing a location tag to the wireless device, wherein the location tag is associated with a location of the wireless device;

performing an authentication for the wireless device via the emergency services identity provider, wherein the authentication utilizes non-user-specific credentials included in an emergency services wireless profile of the wireless device;

upon successful authentication for the wireless device, obtaining, by the emergency services identity provider, a session initiation protocol (SIP) registration request message from the wireless device to initiate the emergency call, wherein the SIP registration request message comprises the location tag;

determining, by the emergency services identity provider, a location of the wireless device based, at least in part, on the location tag; and facilitating the emergency call for the wireless device with a public safety answering point (PSAP) that is determined based on the location of the wireless device, wherein the location of the wireless device is provided to the PSAP.

2. The method of claim 1, wherein the wireless device initiates connection with the radio node of the wireless local area network based on an emergency services access network identifier being broadcast by the radio node indicating support for emergency calling services and the emergency services access network identifier is identified in a wireless profile configured for the wireless device for use in performing the emergency call.

3. The method of claim 2, wherein the emergency services access network identifier is a Roaming Consortium Organizational Identifier (RCOI) for an emergency services identity provider that is to facilitate the authentication for the emergency call.

4. The method of claim 1, wherein the SIP registration request message further comprises an identifier associated with the radio node and the location of the wireless device is determined based on the location tag and the identifier of the radio node.

5. The method of claim 4, wherein the identifier associated with the radio node is at least one of a Basic Service Set Identifier (BSSID) or a Service Set Identifier (SSID).

6. The method of claim 1, wherein the location tag is included in a Private-Access-Network-Info (PANI) header of the SIP registration request message.

7. The method of claim 1, further comprising:

through performing the authentication for the connection of the wireless device with the radio node for the emergency call with the emergency services identity provider, providing location attributes that identify the location of the wireless device, the location tag, and optionally an identifier associated with the radio node to a location database maintained by the emergency services identity provider.

8. The method of claim 7, wherein determining the location of the wireless device includes performing a lookup on the location database using the location tag contained in the SIP registration request message to determine the location attributes, wherein the location of the wireless device is identified from the location attributes.

9. The method of claim 7, wherein the location attributes include one or more of a civic address or geo-spatial coordinates of the radio node or the wireless device.

10. The method of claim 1, wherein the location tag is provided to the wireless device via one of:

a Dynamic Host Configuration Protocol (DHCP) communication exchange involving the wireless device;

an Internet Protocol version 6 (IPv6) Router Advertisement communicated to the wireless device;

an Access Network Query Protocol (ANQP) communication exchange involving the wireless device; or an Institute of Electrical and Electronics Engineers (IEEE) 802.11 Association Response message sent to the wireless device.

11. The method of claim 1, further comprising:

through performing the authentication for the connection of the wireless device with the radio node for the emergency call with the emergency services identity provider, providing emergency calling configuration information to at least one of a controller or the radio node of the wireless local area network that identifies an enhanced call session function managed by the emergency services identity provider.

12. The method of claim 11, further comprising:

providing the emergency calling configuration information to the wireless device to enable the wireless device to initiate the emergency call.

13. The method of claim 12, wherein the emergency calling configuration information includes a Fully Qualified Domain Name (FQDN) for the enhanced call session function and at least one emergency calling number that are to be utilized by the wireless device to initiate the emergency call.

14. The method of claim 12, wherein the emergency calling configuration information is provided to the wireless device via one of:

a Dynamic Host Configuration Protocol (DHCP) communication exchange involving the wireless device;

an Internet Protocol version 6 (IPv6) Router Advertisement communicated to the wireless device;

an Access Network Query Protocol (ANQP) communication exchange involving the wireless device; or an Institute of Electrical and Electronics Engineers (IEEE) 802.11 Association Response message sent to the wireless device.

15. A method comprising:

obtaining, by a session initiation protocol (SIP) enhanced call session function, a SIP registration request message from a wireless device seeking to perform an emergency call, wherein the SIP registration request message comprises a location tag associated with a location of the wireless device;

querying a location function using, at least in part, the location tag to verify authenticity of the location tag based on a stored location tag obtained by the location function from a radio node with which the wireless device is connected;

upon a successful verification of the authenticity of the location tag, obtaining location attributes that identify the location of the wireless device;

identifying a public safety answering point (PSAP) based on the location attributes; and facilitating the emergency call for the wireless device with the PSAP by the SIP enhanced call session function.

16. The method of claim 15, further comprising:

prior to obtaining the SIP registration request message from the wireless device, providing the location tag to the wireless device via the radio node with which the wireless device is connected.

17. The method of claim 16, wherein the SIP registration request message further comprises an identifier associated with the radio node with which the wireless device is connected.

18. The method of claim 17, wherein the identifier associated with the radio node to which the wireless device is connected is at least one of a Basic Service Set Identifier (BSSID) or a Service Set Identifier (SSID).

19. The method of claim 18, wherein the querying includes the identifier associated with the radio node.

20. The method of claim 15, wherein the location function is to verify the authenticity of the location tag by determining whether the location tag obtained from the wireless device matches the stored location tag obtained from the radio node with which the wireless device is connected.

21. One or more non-transitory computer readable storage media encoded with instructions that, when executed by a processor, cause the processor to perform operations, comprising:

facilitating, for an emergency call initiated by a wireless device, connection of the wireless device with a radio node of a wireless local area network that is associated with a roaming federation comprising a plurality of identity providers, the plurality of identity providers comprising an emergency services identity provider;

providing a location tag to the wireless device, wherein the location tag is associated with a location of the wireless device;

performing an authentication for the wireless device via the emergency services identity provider, wherein the authentication utilizes non-user-specific credentials included in an emergency services wireless profile of the wireless device;

upon successful authentication for the wireless device, obtaining, by the emergency services identity provider, a session initiation protocol (SIP) registration request message from the wireless device to initiate the emergency call, wherein the SIP registration request message comprises the location tag;

determining, by the emergency services identity provider, a location of the wireless device based, at least in part, on the location tag; and facilitating the emergency call for the wireless device with a public safety answering point (PSAP) that is determined based on the location of the wireless device, wherein the location of the wireless device is provided to the PSAP.

22. The media of claim 21, wherein the SIP registration request message further comprises an identifier associated with the radio node and the location of the wireless device is determined based on the location tag and the identifier of the radio node.

23. The media of claim 21, wherein the location tag is included in a Private-Access-Network-Info (PANI) header of the SIP registration request message.

24. The media of claim 21, further encoded with instructions that, when executed by the processor, cause the processor to perform further operations comprising:

through performing the authentication for the connection of the wireless device with the radio node for the emergency call with the emergency services identity provider, providing location attributes that identify the location of the wireless device, the location tag, and optionally an identifier associated with the radio node to a location database maintained by the emergency services identity provider.

25. The media of claim 24, wherein determining the location of the wireless device includes performing a lookup on the location database using the location tag contained in the SIP registration request message to determine the location attributes, wherein the location of the wireless device is identified from the location attributes.

26. The media of claim 21, further encoded with instructions that, when executed by the processor, cause the processor to perform further operations comprising:

through performing the authentication for the connection of the wireless device with the radio node for the emergency call with the emergency services identity provider, providing emergency calling configuration information to at least one of a controller or the radio node of the wireless local area network that identifies an enhanced call session function managed by the emergency services identity provider.

27. The media of claim 26, further encoded with instructions that, when executed by the processor, cause the processor to perform further operations comprising:

providing the emergency calling configuration information to the wireless device to enable the wireless device to initiate the emergency call.

28. One or more non-transitory computer readable storage media encoded with instructions that, when executed by a processor, cause the processor to perform operations, comprising:

obtaining, by a session initiation protocol (SIP) enhanced call session function, a SIP registration request message from a wireless device seeking to perform an emergency call, wherein the SIP registration request message comprises a location tag associated with a location of the wireless device;

querying a location function using, at least in part, the location tag to verify authenticity of the location tag based on a stored location tag obtained by the location function from a radio node with which the wireless device is connected;

upon a successful verification of the authenticity of the location tag, obtaining location attributes that identify the location of the wireless device;

identifying a public safety answering point (PSAP) based on the location attributes; and facilitating the emergency call for the wireless device with the PSAP by the SIP enhanced call session function.

29. The media of claim 28, further encoded with instructions that, when executed by the processor, cause the processor to perform further operations comprising:

prior to obtaining the SIP registration request message from the wireless device, providing the location tag to the wireless device via the radio node with which the wireless device is connected.

30. The media of claim 29, wherein the SIP registration request message further comprises an identifier associated with the radio node with which the wireless device is connected.

31. The media of claim 30, wherein the identifier associated with the radio node to which the wireless device is connected is at least one of a Basic Service Set Identifier (BSSID) or a Service Set Identifier (SSID).

* * * * *